(12) United States Patent
Wan et al.

(10) Patent No.: US 8,570,524 B2
(45) Date of Patent: Oct. 29, 2013

(54) STABLE MONOLITHIC INTERFEROMETER FOR WAVELENGHTH CALIBRATION

(75) Inventors: Xiaoke Wan, Gainesville, FL (US); Jian Ge, Gainesville, FL (US)

(73) Assignee: University of Florida Research Foundation, Inc., Gainesville, FL (US)

( * ) Notice: Subject to any disclaimer, the term of this patent is extended or adjusted under 35 U.S.C. 154(b) by 517 days.

(21) Appl. No.: 12/849,046

(22) Filed: Aug. 3, 2010

(65) Prior Publication Data

US 2011/0032529 A1    Feb. 10, 2011

Related U.S. Application Data

(60) Provisional application No. 61/233,894, filed on Aug. 14, 2009, provisional application No. 61/231,067, filed on Aug. 4, 2009.

(51) Int. Cl.
*G01B 9/02* (2006.01)
*G01J 3/45* (2006.01)

(52) U.S. Cl.
USPC ........................................................ 356/451

(58) Field of Classification Search
USPC .......................................... 356/450, 451, 456
See application file for complete search history.

(56) References Cited

U.S. PATENT DOCUMENTS

| | | | | |
|---|---|---|---|---|
| 4,523,846 A * | 6/1985 | Breckinridge et al. | ....... | 356/456 |
| 5,420,687 A * | 5/1995 | Kachanov | ..................... | 356/520 |
| 5,459,677 A * | 10/1995 | Kowalski et al. | ................. | 703/2 |
| 6,870,619 B1 * | 3/2005 | Tenhunen et al. | ............. | 356/330 |
| 6,909,511 B2 * | 6/2005 | Copner et al. | ................ | 356/519 |
| 6,943,889 B2 * | 9/2005 | Modavis | ....................... | 356/451 |
| 7,359,058 B2 * | 4/2008 | Kranz et al. | .................. | 356/452 |
| 7,522,343 B2 * | 4/2009 | Hsieh | ............................ | 359/634 |

FOREIGN PATENT DOCUMENTS

WO    WO2009/126546    10/2009

OTHER PUBLICATIONS

Erskine et al., "Novel Interferometer Spectrometer for Sensitive Stellar Radial Velocimetry," *Imaging the Universe in Three Dimensions: Astrophysics with Advanced Multi-Wavelength, Imaging Devices, ASP Conference Series*, 2000, 195: pp. 501-507.
Ge et al., "An Externally Dispersed Interferometer for Sensitive Doppler Extrasolar Planet Searches," *Publications of the Astronomical Society of the Pacific*, Sep. 2002, 114: pp. 1016-1028.

(Continued)

*Primary Examiner* — Michael A Lyons
(74) *Attorney, Agent, or Firm* — Miles & Stockbridge P.C.; David R. Schaffer; Frederick F. Rosenberger

(57) ABSTRACT

Calibration of an arbitrary spectrometer can use a stable monolithic interferometer as a wavelength calibration standard. Light from a polychromatic light source is input to the monolithic interferometer where it undergoes interference based on the optical path difference (OPD) of the interferometer. The resulting wavelength-modulated output beam is analyzed by a reference spectrometer to generate reference data. The output beam from the interferometer can be provided to an arbitrary spectral instrument. Wavelength calibration of the arbitrary spectral instrument may then be performed based on a comparison of the spectral instrument output with the reference data. By appropriate choice of materials for the monolithic interferometer, a highly stable structure can be fabricated that has a wide field and/or is thermally compensated. Because the interferometer is stable, the one-time generated reference data can be used over an extended period of time without re-characterization.

18 Claims, 11 Drawing Sheets

(56) References Cited

OTHER PUBLICATIONS

Ge et al., "The First Extrasolar Planet Discovered With a New Generation High Throughput Doppler Instrument," *The Astrophysical Journal*, Sep. 2006, 648: pp. 683-695.

Ge, Jian, "Fixed delay interferometry for Doppler extrasolar planet detection," *The Astrophysical Journal*, Jun. 2002, 571: pp. L165-L168.

Harvey et al., "The Gong Instrument Michelson Interferometer," *GONG '94: Hello- and Astero-Seismology, from the Earth and Space, ASP Conference Series*, 1995, 76: pp. 432-435.

Hilliard et al., "Wide-Angle Michelson Interferometer for Measuring Doppler Line Widths," *Journal of the Optical Society of America*, Mar. 1966, 56(3): pp. 362-369.

Li et al., "A laser frequency comb that enables radial velocity measurements with a precision of 1 cm s$^{-1}$," *Nature*, Apr. 2008, 452: pp. 610-612.

Lovis et al., "An extrasolar planetary system with three Neptune-mass planets," *Nature*, May 2006, 441: pp. 305-309.

Mahadevan, Suvrath, "High throughput interferometric Doppler technique for planet detection," Ph.D dissertation, University of Florida, 2006, Publication No. AAT 3347152.

Shepherd et al., "WAMDII: wide-angle Michelson Doppler imaging interferometer for Spacelab," *Applied Optics*, Jun. 1985, 24(11): pp. 1571-1584.

Steinmetz et al., "Fabry-Perot filter cavities for wide-spaced frequency combs with large spectral bandwidth," *Applied Physics B*, 2009, 96: pp. 251-256.

Title et al., "Improvements in birefringent filters. 6: Analog birefringent elements," *Applied Optics*, Jun. 1980, 19(12): pp. 2046-2058.

Wan et al., "Monolithic interferometer for high precision radial velocity measurements," *Advances in Optomechanics, Proceedings of the SPIE*, Sep. 2009, 7424: pp. 061-12.

Ge et al., "Design, performance, and early results from extremely high Doppler precision instruments in a global network," *Proceedings of the SPIE*, Jul. 2010, 7735: pp. OH1-OH12.

\* cited by examiner

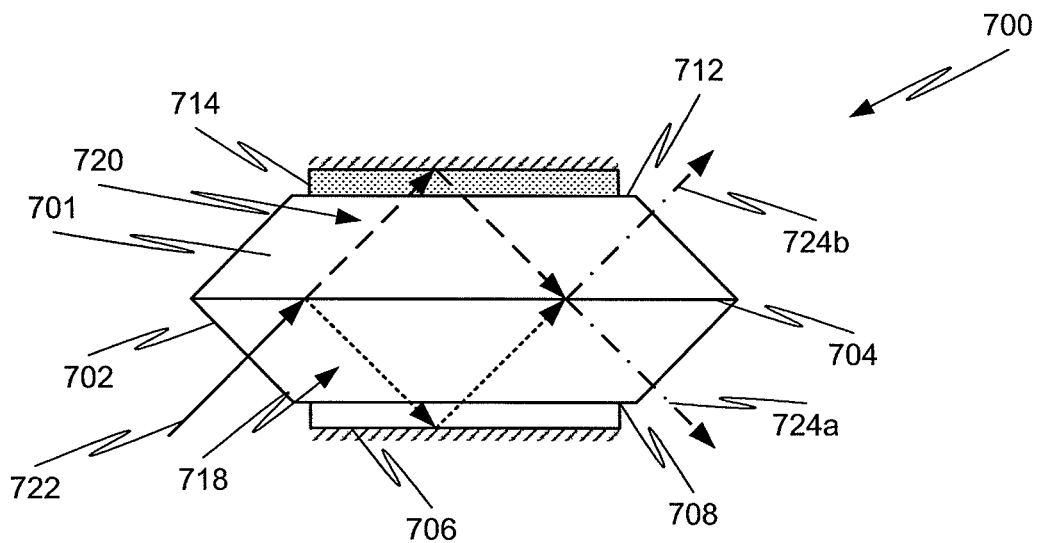
FIG. 7
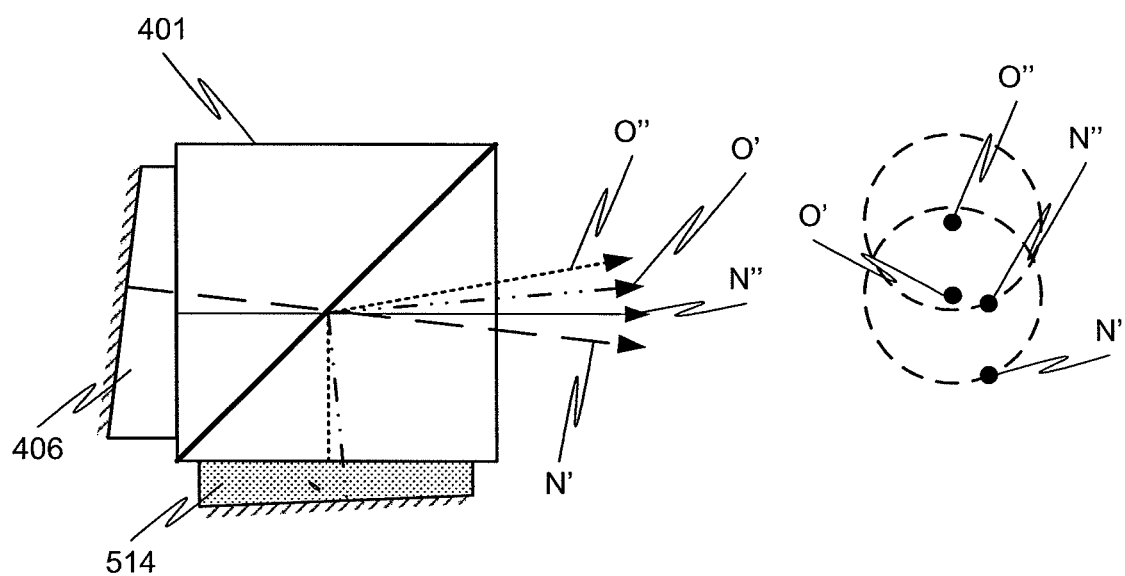
FIG. 8A
FIG. 8B

STABLE MONOLITHIC INTERFEROMETER FOR WAVELENGHTH CALIBRATION

CROSS-REFERENCE TO RELATED APPLICATIONS

The present application claims the benefit of U.S. Provisional Application No. 61/231,067, filed Aug. 4, 2009, and U.S. Provisional Application No. 61/233,894, filed Aug. 14, 2009, both of which are hereby incorporated by reference herein in their entireties.

STATEMENT REGARDING FEDERALLY SPONSORED RESEARCH

The present invention was made with U.S. Government support under grant/contract no. AST-0705139 awarded by the National Science Foundation, Division of Astronomical Sciences. The U.S. Government has certain rights in the invention.

FIELD

The present disclosure relates generally to systems, methods, and devices for wavelength calibration and, more particularly, to stable monolithic interferometer systems and methods for the fabrication, alignment, and use thereof in wavelength calibration.

BACKGROUND

Stability and precision over extended periods of time for a variety of different wavelengths are becoming increasingly important for various optical systems. For example, in next generation extra-solar planetary discovery and investigation, it is desirable to achieve a radial velocity (RV) measurement precision at level of 0.1 meters per second (m/s) annually (as compared to current precision levels in the range of approximately 1 m/s per month). In addition, the range of wavelengths in RV measurements is expanding to include the near-IR portion of the electromagnetic spectrum in addition to the visible portion. To this end, wavelength calibration tools are necessary to ensure appropriate control of the precision of the measurement system over time.

Light sources that use traditional gas emission or absorption lines, such as Thorium-Argon emission lamps or Iodine absorption cells, have been used as calibration standards in the visible light range. However, their lack of calibration sensitivity, variation due to aging, and/or temperature instability may be prohibitive in achieving high-precision in an optical system over an extended period of time. Moreover, these light sources emit visible light and thus may be unable to provide wavelength calibration outside of the visible portion of the electromagnetic spectrum.

High-precision laser combs have been used for wavelength calibration. While the laser comb may have a wide bandwidth and the ability to provide extended wavelength coverage through amplification and nonlinear conversion, they require a significant financial investment, at least initially. In addition, laser combs face many complex issues in terms of maintenance, operation, and implementation, especially with regard to calibration of RV measurement systems. For example, the wavelength peaks generated by the laser combs may be too closely spaced, thereby requiring an external filter, such as a high-finesse etalon or multi-etalon chain, to increase the spacing between wavelength peaks. Reliably matching the etalon cavity length to the laser cavity length can also pose a significant challenge. Moreover, the external filter may have an effect on the wavelength stability of the system in addition to limiting the bandwidth of the laser source.

SUMMARY

Embodiments of the present disclosure may address the above-mentioned problems and limitations, among other things.

Systems, methods, and devices for wavelength calibration of a spectrometer or other spectral instrument using a stable interferometer are disclosed herein. Wavelength calibration of an arbitrary spectrometer can use a stable interferometer, such as, but not limited to, a monolithic Michelson interferometer, a monolithic Fabry-Perot Etalon, or a monolithic Mach-Zehnder interferometer. Light from a polychromatic light source, such as a white light source, can be input to the interferometer where it undergoes interference based on the optical path difference (OPD) of the interferometer. The resulting periodic wavelength-modulated light beam can be analyzed by a reference spectrometer to generate high precision reference data. Subsequently or simultaneously, the output beam from the interferometer can be provided to an arbitrary spectral instrument, the output of which can be compared with the reference data. Such comparison may take the form of a phase trace comparison. Wavelength calibration of the arbitrary spectral instrument may then be performed at least based on the comparison. Because the interferometer is stable, the one-time generated reference data can be used over an extended period of time without a need for re-characterization of the interferometer.

Various designs for a stable monolithic interferometer and fabrication and use thereof are also disclosed herein. By appropriate choice of materials for the monolithic interferometer, a highly stable structure can be fabricated that has a wide field and/or is thermally compensated. The stable monolithic interferometer can be thermally homogenous and continuous. By such a configuration, not only can the stability, security, and fabrication costs for an interferometer be improved over conventional designs, but the component fabrication and assembly into a monolithic device can be simplified. The stable interferometer can be used in a variety of spectral applications, including, but not limited to, use as a wavelength calibration reference for spectrometers, tunable lasers, or other spectral instruments.

In embodiments, a method for wavelength calibration of a spectral instrument can include directing light from a broadband light source to an input of a monolithic interferometer so as to generate a periodic wavelength-modulated light output. The wavelength-modulated light output can be directed to the spectral instrument so as to generate test data as a function of wavelength. The test data can be compared to reference data generated using said monolithic interferometer. The spectral instrument can then be adjusted based at least in part on the comparison.

In embodiments, a wavelength calibration apparatus can include a monolithic Michelson interferometer. The interferometer can have a beamsplitter constructed to divide wideband input light incident on an input face thereof into a reflected beam along a reflected light path and a transmitted beam along a transmitted light path. A first mirror element can be arranged in the reflected light path and secured to the beamsplitter. A second mirror element can be arranged in the transmitted light path and secured to the beamsplitter. An absolute value of a thermal sensitivity of an optical path difference between the reflected and transmitted light paths of the interferometer can be less than or equal to $3\times10^{-6}/°C$.

Objects and advantages of embodiments of the present disclosure will become apparent from the following description when considered in conjunction with the accompanying drawings.

BRIEF DESCRIPTION OF DRAWINGS

Embodiments will hereinafter be described in detail below with reference to the accompanying drawings, wherein like reference numerals represent like elements. The accompanying drawings have not necessarily been drawn to scale. Where applicable, some features may not be illustrated to assist in the description of underlying features. In addition, certain features, such as wedge angles of various components, may be exaggerated in the figures for illustration purposes.

FIG. 7 shows a monolithic Mach-Zehnder interferometer, according to one or more embodiments of the disclosed subject matter.

FIG. 8A shows the monolithic Michelson interferometer of FIG. 5B with illustrations of the different surface normals of the components thereof.

FIG. 8B shows the path of the surface normals of the components of FIG. 8A during a rolling alignment process.

DETAILED DESCRIPTION

A stable interferometer can be used as part of a wavelength reference or standard for calibration of spectrometers, tunable laser, or other types of spectral instruments. For example, a white light source can be coupled to the stable interferometer such that interference in the interferometer generates output light that has an intensity that varies as a function of wavelength. The stable interferometer can have a fixed optical path difference (OPD) such that the periodic modulation of the output light does not significantly change over time. The output light can be transmitted to a reference spectrometer so as to ascertain the relationship between the output light pattern, or phase angle, and the optical frequency, or wavelength. The stable interferometer, together with the ascertained relationship, can then be used to calibrate a spectral instrument.

In embodiments, the stable interferometer may be a monolithic interferometer, such as a Michelson interferometer. By appropriate selection of the materials and dimensions of the monolithic interferometer, the interferometer may be field-compensated and/or thermally-compensated. As such, the interferometer may provide a repeatable wavelength-modulated light output with little to no change over time. When coupled with an appropriate light source, the repeatable wavelength-modulated light output provides a wavelength calibration standard by which other optical instruments may be adjusted to compensate for variations/degradation over time.

Figure 1:
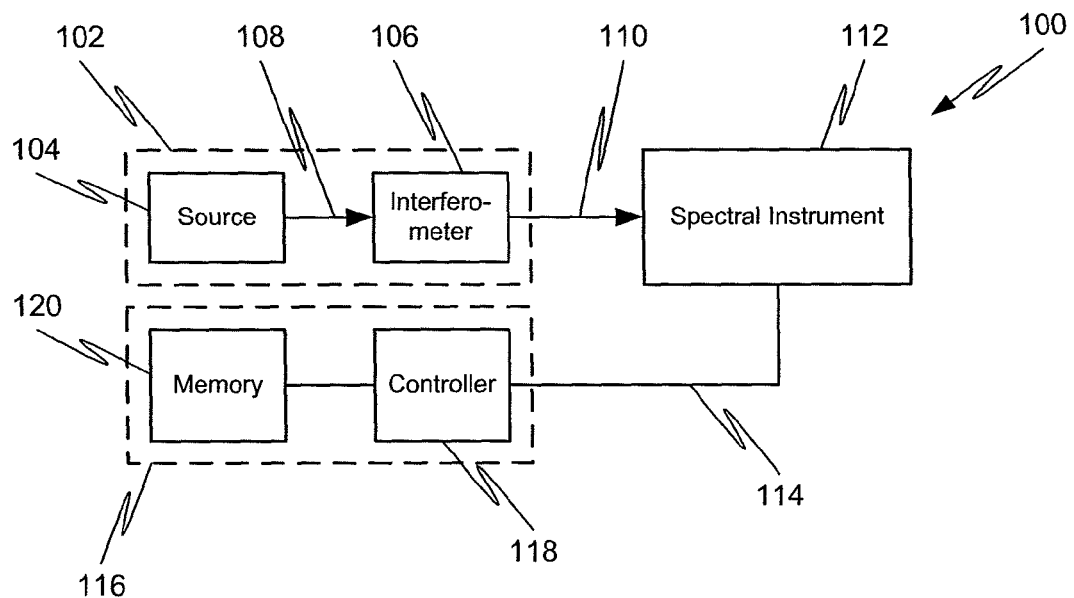
FIG. 1 is a schematic diagram showing a setup for wavelength calibration of a spectral instrument using a stable interferometer, according to one or more embodiments of the disclosed subject matter.

Referring now to FIG. 1, a schematic diagram of a wavelength calibration setup 100 is shown. A white light source 104 can provide input light 108 to a stable interferometer 106. The white light source 104 can generate light at substantially a constant intensity over a wide wavelength range. For example, the white light source may be a continuum wideband light source, such as, but not limited to, a tungsten lamp or light emitting diode (LED). Light 108 enters the stable interferometer 106, wherein interference based on an OPD of the interferometer 106 generates a periodic wavelength-modulated light output 110. Output 110 can include a plurality of light wavelengths, each having a different intensity based on degree of interference in the interferometer 106. By appropriate design of the interferometer 106, the light output 110 may have a substantially sinusoidal intensity distribution as a function of the wavelength (or optical frequency) of the input light 108.

A spectral instrument 112 may receive the light output 110 and process the light 110 according to the function of the instrument 112. A controller 118 can be provided to interact with the spectral instrument 112 to effect calibration thereof and/or to store reference data in memory 120. For example, the spectral instrument 112 may be a spectrometer. In another example, the interferometer serves as a stable wavelength reference for wavelength stabilization or characterization of a laser.

Figure 2:
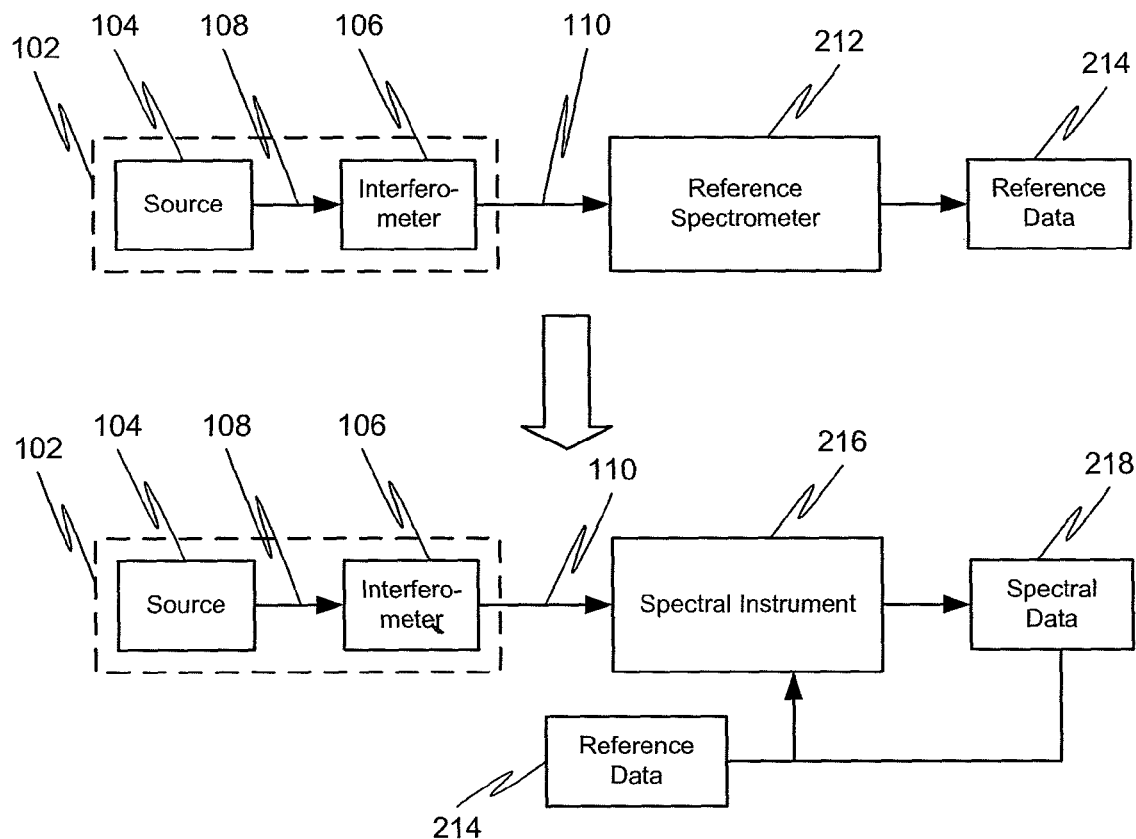
FIG. 2 is a schematic diagram showing a setup for wavelength calibration of a spectral instrument using a stable interferometer and previously determined reference data, according to one or more embodiments of the disclosed subject matter.

For example, the spectral instrument may be a high-precision reference spectrometer 212 (shown in FIG. 2), such as a high-precision Fourier Transform spectrometer 212. The spectrometer 212 may measure the intensity at each wavelength of the light 110 and generate reference data 214, such as phase angle as a function of optical frequency. Since the light output 110 of the interferometer 106 is consistent and stable over time, the output 110 can be used to calibrate the response of another spectral instrument 216. After generation of the reference data 214, the spectral instrument 216 can generate its own spectral data 218 as a function of the light 110 from the interferometer 106. By comparing the spectral data 218 with the reference data 214 and adjusting the spectral instrument 216 based on the comparison, the spectral instrument 216 can be calibrated with respect to wavelength.

Although shown as separate components, the white light source 104 and interferometer 106 can be integrated as a single calibration unit 102, for use in calibrating a spectral instrument. For example, the calibration unit 102 may be provided as a wavelength calibration standard to replace monochromatic lasers or polychromatic gas cells and emission lamps. The white light source 104 and the interferometer 106 may also be provided as separate components, for example, when environmental control of the interferometer 106 may be necessary to provide sufficient stability for wavelength calibration.

Although shown as separate components, the memory 120 and controller 118 may be incorporated into a single control unit 116. Moreover, one or more of these components illustrated in FIG. 1 may be integrated with one or more components or elements in setup 100. For example, memory 120 may be integrated with the calibration unit 102, wherein memory 120 stores reference data for the combined white light source 104 and interferometer 106, as measured by a reference spectrometer. In another example, controller 118 and/or memory 120 may be integrated with the spectral instrument 112. In addition, one or more of these components may be eliminated from setup 100. For example, memory 120 and/or controller 118 may be eliminated in favor of manual calibration of the spectral instrument by an operator.

Because a stable interferometer is used, the light output 110 does not substantially change with time, pressure, and/or temperature. Thus, once the characteristics of the light 110 are determined, the characteristics should not need to be subsequently determined again, or at least not until a substantial period of time has elapsed (e.g., months). Similarly, the reference data 214 generated by the reference spectrometer 212 and indicative of the light output 110 characteristics may only need to be generated once, or at least not regenerated until a substantial period of time (e.g., months) has elapsed. After the reference data 214 is generated, the calibration unit 102 can subsequently be used in the calibration of one or more spectral instruments 216 at various times.

Figure 3:
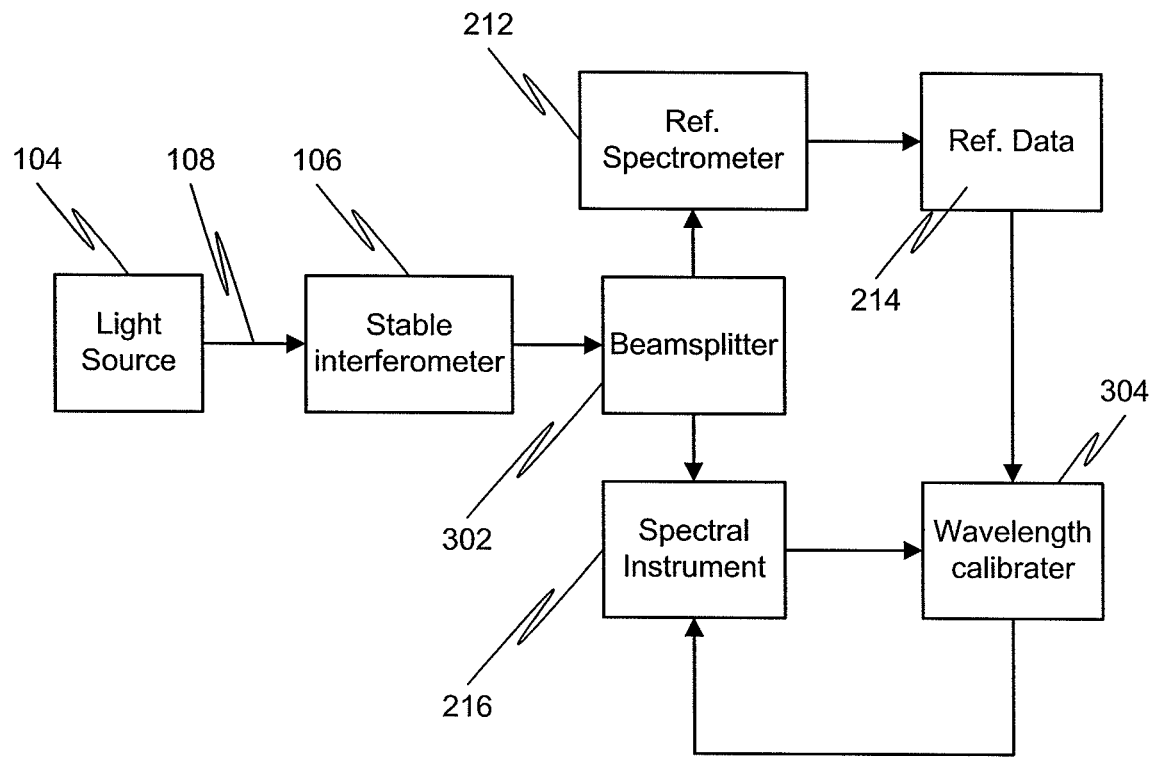
FIG. 3 is a schematic diagram showing a setup for wavelength calibration of a spectral instrument using a stable interferometer and simultaneously determined reference data, according to one or more embodiments of the disclosed subject matter.

Alternatively, the determination of the output characteristics of the interferometer 106 by the reference spectrometer 212 may occur simultaneously with the light being provided to a spectral instrument 216 to be calibrated. With reference to FIG. 3, wavelength-modulated light from a stable interferometer 106 can be input to a beamsplitter 302, which divides the light into a reference component and a test component. The reference component is directed along an optical path to the reference spectrometer 212, whereby reference data 214 indicative of the characteristics of the light with respect to wavelength is generated. Simultaneously, the test component is directed along an optical path to a spectral instrument 216, whereby spectral data is generated. A wavelength calibration unit 304, which may include controller 118 or be integrated into spectral instrument 216, can receive the reference data 214 and the spectral data. The wavelength calibration unit 304 may adjust the spectral instrument 216 until the spectral data substantially corresponds to the reference data 214. Thus, the reference data may be adjusted by the reference spectrometer to account for any variations in the stable interferometer OPD simultaneously with the calibration of the spectral instrument 216. After calibration, the spectral instrument 216 may be disconnected from the calibration setup and used according to its designed purpose.

Reference data may also be generated at discrete time intervals. For example, although light from the interferometer 106 is continuously directed by beamsplitter 302 to reference spectrometer 212, the reference spectrometer 212 may be configured to only analyze the light and generate reference data 214 at start-up or at specific time intervals. In another example, beamsplitter 302 can be replaced with an optical switch. In one mode of operation, the optical switch may direct light from the interferometer 106 to the spectral instrument 216. In a second mode of operation, the optical switch may redirect the light from the interferometer to the reference spectrometer 212 for the generation of reference data. After the generation or regeneration (i.e., updating) of the reference data, the optical switch may return to the first mode of operation for calibration of the spectral instrument 216.

Any stable interferometer capable of generating a periodic output as function of the input wavelength of light can be used. Preferably, the interferometer is sufficiently compensated so as to be highly stable with respect to time, temperature, pressure and/or light source alignment. An exemplary interferometer may have sufficient stability such that the OPD has a variation of less than $10^{-5}$ over a period of several years. Moreover, the exemplary interferometer may have a temperature response (i.e., thermal sensitivity) of less than $3\times10^{-6}$/° C. in absolute value (e.g., between approximately $-3\times10^{-6}$/° C. and approximately $3\times10^{-6}$/° C.). For example, the stable interferometer may be a monolithic Michelson interferometer, which has been constructed to be field compensated and/or thermally compensated. In another example, the stable interferometer may be a monolithic Fabry-Perot interferometer. In still another example, the stable interferometer may be a monolithic Mach-Zehnder interferometer.

Embodiments of the wavelength calibration system and process, as described herein, are not limited to the above examples of interferometers. Rather, any interferometer capable of a stable OPD and producing the desired light output can be used according to one or more contemplated embodiments. Moreover, it is not required for the interferometers to be monolithic to be stable. For example, active adjustment of one or more interferometer components can be provided so as to actively "lock" the OPD of the interferometer at a constant value, thereby providing a stable wavelength calibration standard.

However, the use of a monolithic Michelson interferometer may have certain advantages, depending on the application. For example, the Michelson interferometer can be made wide-field such that the optical throughput and spatial multiplexing capacity is relatively high. Because there are only two interference arms in a Michelson interferometer, it can be comparatively easy to provide proper coatings for wide wavelength applications. In view of these benefits, wavelength multiplexing/de-multiplexing can be achievable with Michelson interferometry. Moreover, the optical frequency response of a Michelson interferometer is sinusoidal, which can simplify and increase the accuracy of signal processing as compared to other types of frequency responses. Because of its relatively simple configuration, a Michelson interferometer may also be suitable for monolithic constructions and miniaturization. Thermal compensation of the Michelson interferometer may also be possible in a relatively compact design.

Although it is not required for the interferometer to be monolithic, a monolithic construction for the interferometer may also provide certain advantages, such as permanent alignment and ease of system integration. In normal operation within an optical system, it is generally desired that the OPD between the interferometer paths be stable, so as to provide a predictable interference pattern. Accordingly, the ability to have a wide field (i.e., OPD insensitivity to input angle) and to compensate for temperature variations is advantageous.

Figure 4:
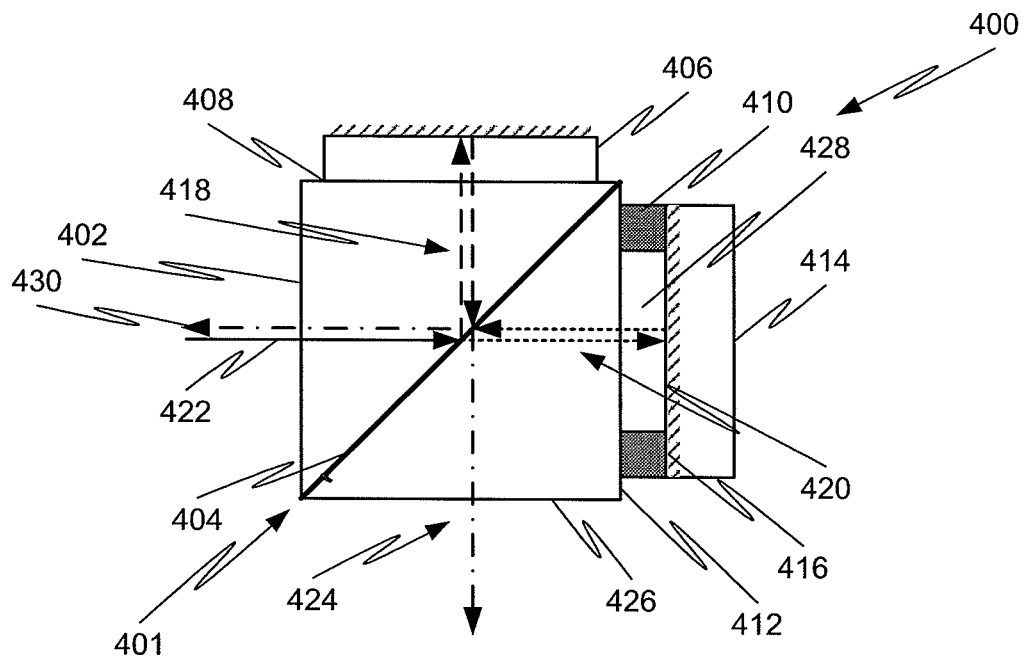
FIG. 4 shows a monolithic Michelson interferometer including a spacer ring and a first surface mirror, according to one or more embodiments of the disclosed subject matter.

FIG. 4 shows a monolithic wide-field Michelson interferometer 400. The optical components of the monolithic interferometer 400 include a beamsplitter 401 having a partial mirror 404 therein. Light 422 input to the beamsplitter 401 at an input surface 402 thereof is partially reflected along reflected path 418 and partially transmitted along transmitted path 420. The reflected path 418 includes a second surface mirror 406 adjacent to and in contact with a surface 408 of the beamsplitter 401. Light reflected from partial mirror 404 is further reflected back toward the partial mirror 404 after traversing the thickness of the second surface mirror 406. The transmitted path 420 includes a first surface mirror 414, which has a mirror surface in contact with surface 416 of a spacer 410. Spacer 410 is adjacent to and in contact with a surface 412 of the beamsplitter 401 and encloses an air cavity 428 between the first surface mirror 414 and the beamsplitter surface 412. Light transmitted by partial mirror 404 is reflected back toward the partial mirror 404 after traversing the air cavity 428. The light incident back on the partial mirror 404 from the reflected path 418 and transmitted path 420 is partially transmitted and reflected, as appropriate, to generate a first output light beam 424 exiting through output surface 426 and a second output light beam 430 exiting through input face 402. Because of the OPD between the light travelling in the reflected path 418 and the transmitted path 420, an interference pattern and/or phase difference is generated in the output light beams 424 and 430, which can be used for further optical processing.

A discontinuity in thermal expansion could make the interferometer assembly unstable and insecure, such that it is difficult to achieve reliable long term stability. For example, wide-field thermally-compensated Michelson interferometers may employ BK7 glass for the beamsplitter 401 and/or the second surface mirror 406. The spacer element 410 may be formed of copper. Thus, a thermal expansion discontinuity may result from the difference in thermal expansion coefficients for the copper and BK7 glass components. In the arrangement of FIG. 4, such discontinuities may be unavoidable due to the requirements of field compensation and thermal compensation. Alternative designs, as presented in FIGS. 5A-5C below, and appropriate selection of materials may compensate for these discontinuities while providing field compensation and/or thermal compensation.

For a field compensated interferometer, such as that shown in FIG. 4, with a fixed OPD of D, the following equations can be satisfied:

$$n_1 t_1 - t_2 = \frac{D}{2}, \quad (1)$$

$$\frac{t_1}{n_1} - t_2 = 0, \quad (2)$$

where n and t represents the refractive index and the thickness, respectively, and the subscript 1 and 2 correspond to the second surface mirror 406 and the spacer 410, respectively. Note that since the optical path within the spacer 410 is comprised of air, the refractive index for the spacer 410 would be considered as 1.

Thus, for a given OPD, the thicknesses of the mirror 406 and the spacer 410 can be determined from the equations (1)-(2). In general, the spacer 410 with first surface mirror 414 may be located in the shorter OPD arm of the interferometer, whether that arm is the transmitted arm 420 or the reflected arm 418. If it is desirable that the interferometer 400 also be thermally compensated $$\left(\text{i.e., } \frac{dD}{dT} = 0\right),$$

then the following thermal compensation equation can be satisfied:

$$\left(\frac{dn_1}{dT} + \alpha_1 n_1\right) t_1 - \alpha_2 t_2 = 0, \quad (3)$$

where $\alpha_1$ and $\alpha_2$ represent, respectively, the constant of thermal expansion (CTE) of each material.

If the beamsplitter 401 and the second surface mirror 406 are made from the same material, e.g., BK7, they will both have the same CTE, e.g., $\alpha_1 = 7.1 \times 10^{-6}/°$ C. It is of course contemplated that the mirror 404 in the beamsplitter 401 may be made from a different material (such as a thin coating of aluminum) without substantially affecting the thermal response of the beamsplitter. Beamsplitter 401 can thus be considered a single material despite any coating defining the mirror 404 for purposes of interferometer design for field and thermal compensation described herein.

Using equation (3) above, a CTE, $\alpha_2$, for thermal compensation can be calculated as approximately $19 \times 10^{-6}/°$ C. For such a CTE, a metal material, such as copper, is suitable as well as some glass materials, like $CaF_2$. The OPD thus weakly depends on temperature. A thermal sensitivity, S, can be defined by the equation:

$$S = \frac{1}{OPD} \frac{dOPD}{dT}. \quad (4)$$

The assembling and bonding process between the high CTE spacer 410 to the low CTE glass materials of the interferometer 400 can be technically challenging, primarily because any residual thermal stress will likely affect the alignment and undermine the stability of the interferometer over time. Accordingly, it is desirable to eliminate the CTE discrepancy between the various components of the interferometer, such that the entire monolithic assembly is homogeneous in thermal expansion and contraction.

Figure 5A:
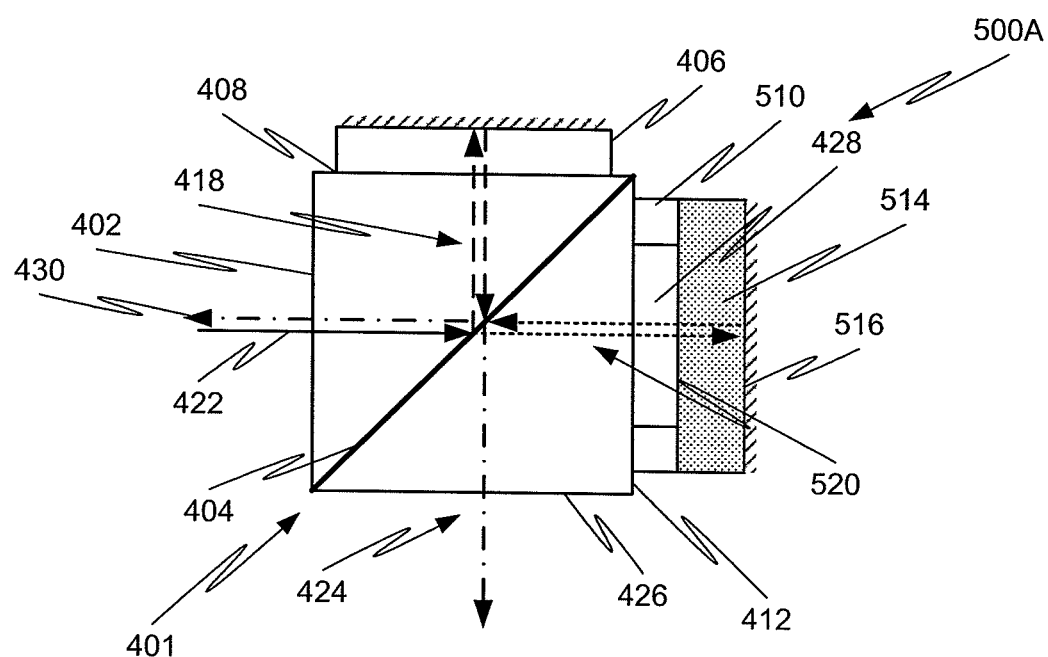
FIG. 5A shows a monolithic Michelson interferometer including a spacer ring and a second surface mirror, according to one or more embodiments of the disclosed subject matter.

FIG. 5A illustrates an embodiment of a monolithic Michelson interferometer 500A that satisfies such criteria. In contrast to the embodiment of FIG. 4, the air spacer 510 and the beamsplitter 401 can be formed from the same material, or at least formed from materials with matched CTEs. Also, in contrast to FIG. 4, the front surface mirror 414 coupled to spacer 410 is replaced with a second surface mirror 514 coupled to spacer 510.

Thus, the reflected path 418 can include a second surface mirror 406 adjacent to and in contact with a surface 408 of the beamsplitter 401. Light reflected from partial mirror 404 is further reflected back toward the partial mirror 404 after traversing the thickness of the second surface mirror 406. The beamsplitter 401 and the second surface mirror 406 may be formed from a first material. The transmitted path 520 can include a second surface mirror 514, which has a mirror surface 516. The second surface mirror 514 may be in contact with spacer 510, which itself is adjacent to and in contact with a surface 412 of the beamsplitter 401. Spacer 510 may also be formed from the first material, such that the second surface mirror 406, the beamsplitter 401, and the spacer 510 are all the same first material. However, second surface mirror 514 may be formed from a different material than the first material, in accordance with the field and thermal compensation techniques described herein.

For the Michelson interferometer configuration of FIG. 5A, the field and thermal compensation equations become:

$$n_3 t_3 + t_2 - n_1 t_1 = \pm \frac{D}{2}, \tag{5}$$

$$\frac{t_3}{n_3} + t_2 - \frac{t_1}{n_1} = 0, \tag{6}$$

$$\left(\frac{dn_3}{dT} + \alpha_3 n_3\right) t_3 + \alpha_1 t_2 - \left(\frac{dn_1}{dT} + \alpha_1 n_1\right) t_1 = 0, \tag{7}$$

wherein n represents the refractive index, t represents the component thickness, D represents the OPD, α represents the CTE of the respective material, T is temperature, the subscript 1 corresponds to the second surface mirror 406, the subscript 2 corresponds to the spacer 510, and the subscript 3 corresponds to the second surface mirror 514. Note that the ± symbol in equation (5) indicates that the air-spaced arm can be chosen in either the longer OPD arm or the shorter OPD arm. For any two different materials of matching CTEs, there are solutions of thicknesses that satisfy the above equations, thereby resulting in both field compensation and thermal compensation of the Michelson interferometer.

Figure 5B:
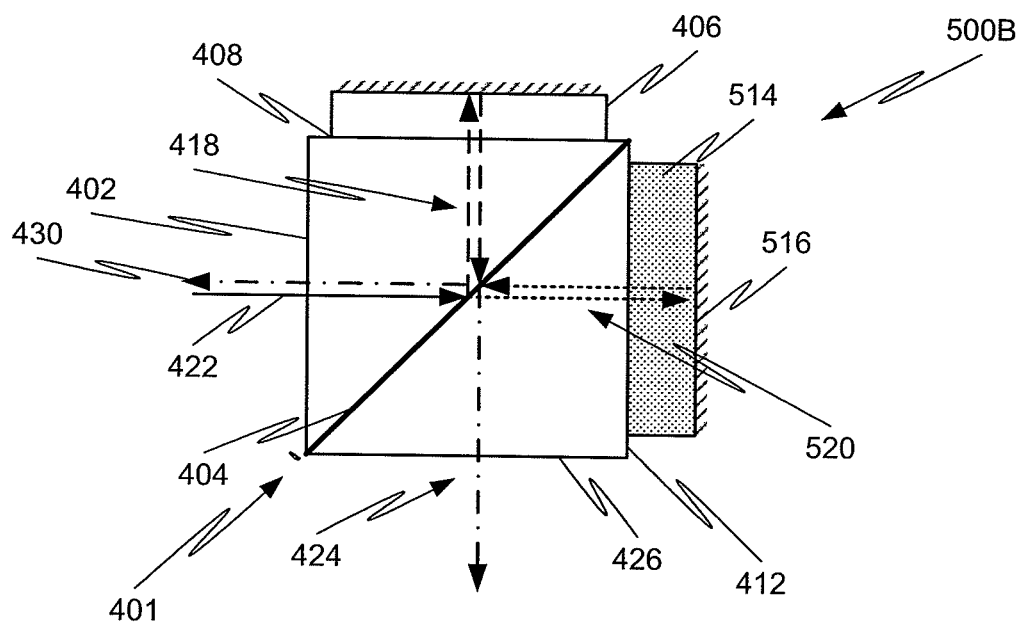
FIG. 5B shows another monolithic Michelson interferometer with second surface mirrors, according to one or more embodiments of the disclosed subject matter.

Referring now to FIG. 5B, an alternative embodiment for a monolithic Michelson interferometer 500B is shown. In contrast to the embodiment of FIG. 5A, interferometer 500B does not include a spacer component. Rather, second surface mirror 514 is directly adjacent to and in contact with surface 412 of beamsplitter 401. Such a configuration is not only homogenous, but also compact and continuous. Therefore, an interferometer with increased stability and security can be achieved. Moreover, by eliminating the air space 428 bounded by spacer 510 of the embodiment of FIG. 5A, sensitivity to pressure may be reduced by several orders of magnitude (e.g., three orders of magnitude). Interferometer 500B may also be less susceptible to air turbulence. However, because it has one less degree of freedom (i.e., one less thickness, CTE, and index of refraction) in the design as compared to the embodiment of FIG. 5B, material selection may be more constrained, thermal and/or field compensation may be incomplete, and/or the thickness of the components may need to be increased.

For the Michelson interferometer illustrated in FIG. 5B, field compensation can satisfy:

$$\frac{t_1}{n_1} = \frac{t_2}{n_2}, \tag{8}$$

and thermal compensation can satisfy:

$$\left(\frac{dn_1}{dT} + \alpha_1 n_1\right) t_1 = \left(\frac{dn_2}{dT} + \alpha_2 n_2\right) t_2. \tag{9}$$

The combination of field compensation and thermal compensation yields:

$$n_1 \frac{dn_1}{dT} + \alpha_1 n_1^2 = n_2 \frac{dn_2}{dT} + \alpha_2 n_2^2, \quad \text{or} \tag{10}$$

$$C_1 = C_2, \quad \text{where } C_i = n_i \frac{dn_i}{dT} + \alpha_i n_i^2. \tag{11}$$

Thus, materials for the second surface mirror 406 and the second surface mirror 514 can be selected to have matched compensation coefficients, $C_i$, in addition to having matched CTEs. A thermal sensitivity for the monolithic Michelson interferometer can also be calculated as:

$$S = \frac{1}{OPD} \frac{dOPD}{dT} = \frac{C_1 - C_2}{n_1^2 - n_2^2}. \tag{12}$$

If the field compensation is satisfied exactly, then the materials of the Michelson interferometer can be selected such that the thermal sensitivity given by equation (12) above is minimized for optimal thermal compensation. For example, when thermal compensation cannot be complete (e.g., when particular material combinations cannot result in an S=0), it may be desirable to select materials for the Michelson interferometer, as discussed herein, so as to achieve a thermal sensitivity, S, that has an absolute value that does not exceed $3 \times 10^{-6}/°C$.

Additional optimizations may include minimizing the glass thicknesses for a designed OPD, extending wavelength range, sacrificing field compensation in favor of minimizing or eliminating thermal sensitivity at a particular wavelength or wavelength range, and/or reducing material attenuation. Table 1 is a partial list of potential material candidates for the second surface mirror 406 (and beamsplitter 401) and the second surface mirror 514. Table 1 also shows thermal sensitivities at wavelengths of 546 nm and 1060 nm for the particular material combinations. The list was generated by searching approximately 5000 pair combinations from approximately one hundred common optics glass materials in a Schott glass catalogue. The range of CTEs was confined between $6 \times 10^{-6}/°C$ and $8 \times 10^{-6}/°C$, although other ranges are also possible according to one or more contemplated embodiments.

In an example, a material combination for a monolithic Michelson interferometer can include BK7 and LAK7. BK7 beamsplitters are widely available and their CTEs are matched exactly. In perfect field compensation, the thermal sensitivity of such an interferometer is calculated as approximately $-1.2\times10^{-6}/°$ C. at a wavelength of 546 nm and as approximately $-2.2\times10^{-6}/°$ C. at a wavelength of 1060 nm. For a 7 mm OPD and at a 546 nm designed wavelength, the calculated nominal thickness is 12.360 mm and 13.463 mm for BK7 and LAK7, respectively. For a 10 mm OPD, the calculated nominal thicknesses become 17.658 mm and 19.233 mm for BK7 and LAK7, respectively.

monolithic device or a component thereof. For example, it may be possible to increase the degree of freedom in selection of materials and other design parameters by stacking more components together in a single monolithic interferometer device. In addition, by combining a third material or additional materials, the design and fabrication freedoms may be extended with fewer or the same number of components. Benefits of such a configuration may include, but are not

TABLE 1

Selected material pairs with refractive indexes, CTEs and calculated interferometer thermal sensitivities.

| Material | | $n_1$ | $\alpha_1 \times 10^{-6}/°$ C. | $n_2$ | $\alpha_2 \times 10^{-6}/°$ C. | $S \times 10^{-6}$ 546 nm | 1060 nm |
|---|---|---|---|---|---|---|---|
| N-PSK3 | N-LAK21 | 1.554 | 6.2 | 1.643 | 6.8 | 0.821 | 0.116 |
| N-LaK7 | N-BK7 | 1.654 | 7.1 | 1.519 | 7.1 | −1.243 | −2.17 |
| N-LAK12 | N-BK7 | 1.681 | 7.6 | 1.519 | 7.1 | −1.019 | −2.147 |
| N-BK7 | N-SK4 | 1.519 | 7.1 | 1.615 | 6.46 | 1.021 | −0.207 |
| K10 | N-SK4 | 1.503 | 6.5 | 1.615 | 6.46 | 0.177 | −0.479 |
| K10 | N-SK18 | 1.503 | 6.5 | 1.641 | 6.4 | 1.119 | 0.171 |
| N-SK18 | N-LLF1 | 1.641 | 6.4 | 1.551 | 7.97 | −0.883 | −0.595 |
| N-BAK4 | N-LAK9 | 1.571 | 6.99 | 1.694 | 6.3 | 1.156 | 1.334 |
| N-SSK8 | N-LLF6 | 1.621 | 7.21 | 1.534 | 7.66 | −0.702 | −0.988 |
| N-LLF6 | N-SSK5 | 1.534 | 7.66 | 1.662 | 6.8 | 0.499 | −0.191 |
| N-LLF6 | N-LAK9 | 1.534 | 7.66 | 1.694 | 6.3 | 0.476 | 0.854 |
| N-BAF4 | N-LAK9 | 1.609 | 7.24 | 1.694 | 6.3 | 0.021 | 1.528 |
| N-LAK9 | N-BALF4 | 1.694 | 6.3 | 1.582 | 6.52 | −1.005 | −0.787 |
| N-BALF4 | N-LAF3 | 1.582 | 6.52 | 1.721 | 7.6 | 1.085 | 0.09 |
| N-LAF3 | N-KZFS4 | 1.721 | 7.6 | 1.617 | 7.3 | −0.365 | −0.665 |
| N-LAK33 | N-F2 | 1.757 | 6 | 1.624 | 7.84 | −0.666 | 0.119 |
| N-SF5 | N-LAF21 | 1.678 | 7.94 | 1.792 | 6.2 | 0.755 | 2.101 |
| N-LASF31 | SF15 | 1.886 | 6.8 | 1.704 | 7.9 | −0.014 | 1.663 |
| SF15 | N-LaSF45 | 1.704 | 7.9 | 1.806 | 7.3 | 1.218 | 2.582 |
| SF14 | N-LASF35 | 1.769 | 6.6 | 2.03 | 7.4 | 0.957 | 1.109 |

For beamsplitter 401, surfaces 408 and 412 can be uncoated while input surface 402 and/or output surface 426 can have a coating thereon. For example, an anti-reflection coating can be provided on the input surface 402 and/or output surface 426. The input surfaces of second surface mirrors 406 and 514 (i.e., the surface in the respective optical path closest to the beamsplitter 401) may also be uncoated. By having uncoated surfaces, the stability of a bond between the uncoated surfaces (e.g., between mirror 406 and beamsplitter 401) can be increased, and any reflection at the interface between the bonded surfaces can be minimized, or at least reduced.

In addition, the uncoated surfaces 408 and 412 of the beamsplitter 401 may be employed to characterize the beamsplitter 401 during or prior to assembly with the second surface mirrors to form a monolithic interferometer. By illuminating the beamsplitter 401 with a monochromatic light source or an extended white light source, the uncoated surfaces of the beamsplitter may result in the formation of an interference pattern, which can be used to measure surface tilt angle, distortion, and/or thickness variations/imbalance of the beamsplitter. Based on these measurements, the beamsplitter can be graded for various interferometer applications, and the characteristics of the beamsplitter can be registered for correction or compensation purposes.

Other interferometer configurations are also possible according to one or more contemplated embodiments. Different interferometer configurations may be based on tradeoffs between various design parameters, using a different catalogue of available optical components, employing exotic or non-standard optical materials, and/or stacking a different number (more or fewer) optical components to construct a limited to, different combinations of compensation results, expanded or narrowed wavelength regions as well as other features, such as polarization manipulation and wavelength/phase multiplexing/de-multiplexing.

Figure 5C:
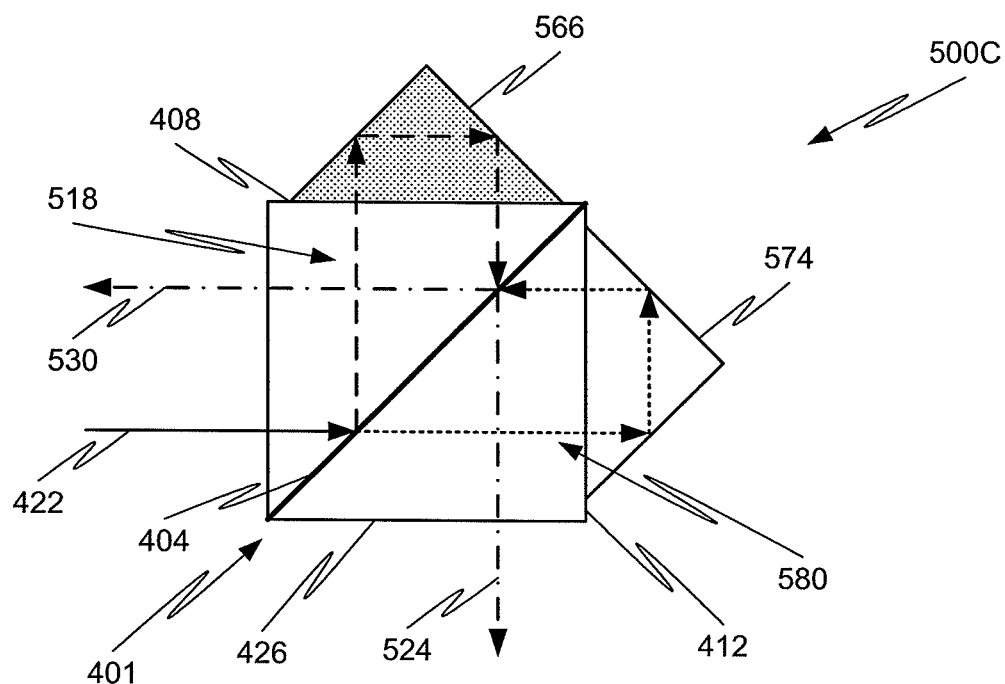
FIG. 5C shows another monolithic Michelson interferometer with roof mirrors, according to one or more embodiments of the disclosed subject matter.

Referring now to FIG. 5C, another alternative embodiment for a monolithic Michelson interferometer 500C is illustrated. In particular, the interferometer 500C includes a beamsplitter 401 with a first roof mirror 566 and a second roof mirror 574 replacing the second surface mirrors 406 and 514 of the interferometer 500B of FIG. 5B. Total frustrated reflections occur in the roof mirrors 566, and 574. As a result, incoming light 422 is partially reflected along reflected path 518 and partially transmitted along transmitted path 580. Light in the reflected path 518 interacts with roof mirror 566 and is reflected and displaced by the interaction. Similarly, light in the transmitted path 580 interacts with roof mirror 574 and is reflected and displaced by the interaction. After returning to the partial mirror 404, the reflected and displaced beams are further partially transmitted/reflected thereby producing output beam 524 and return beam 530. Roof mirror 566 may be formed from a different material than roof mirror 574, so as to satisfy the field and thermal compensation equations, as discussed in detail above. For the same OPD, the interferometer of FIG. 5C may be more compact than the interferometer of FIG. 5B, but at a potential cost of a reduced clearance aperture. For example, the clearance aperture may be reduced by as much as 50% as compared with the interferometer of FIG. 5B. In addition, the return beam 530 is separate from the input beam 422 such that collection of the return beam 530 may be more convenient.

Figure 6:
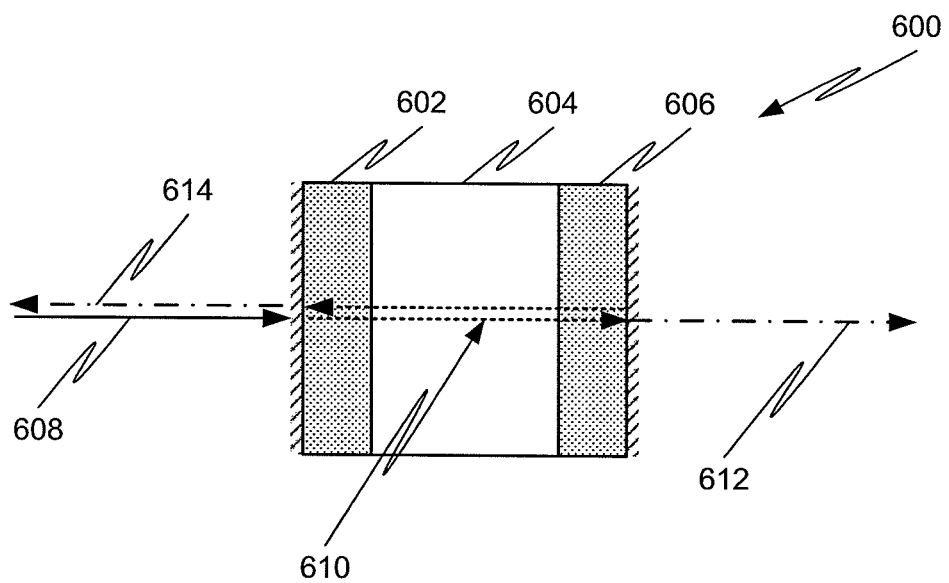
FIG. 6 shows a monolithic Fabry-Perot interferometer or etalon, according to one or more embodiments of the disclosed subject matter.

As referenced above, other interferometer configurations are also possible according to one or more contemplated embodiments. For example, a monolithic Fabry-Perot interferometer 600 (also referred to as an Etalon) can be used. Referring to FIG. 6, the optical components of the monolithic Fabry-Perot interferometer 600 can include a first mirror 602, a spacer 604, and a second mirror 606. Mirrors 602 and 606 can have the same or different reflectance values. In general, the mirrors 602 and 606 can be partially reflective and can have the same reflectance value. Light 608 input to the first mirror 602 of the Fabry-Perot interferometer 600 is partially transmitted through the first mirror 602 into the spacer 604. Spacer 604 may be solid such that the transmitted light 610 travels therethrough. Alternatively, spacer 604 may be a spacer ring which encloses an air or fluid space through which the transmitted light 610 travels. Light 610 between mirrors 602 and 606 is partially reflected and transmitted as it travels back and forth between the mirrors. Because of the OPD between light that is reflected and transmitted at each mirror 602 and 606, an interference pattern and/or phase difference is generated in the forward output light beam 612 and the reverse output light beam 614, which can be used for further optical processing.

In another example, a monolithic Mach-Zehnder interferometer 700 can be used. The monolithic Mach-Zehnder interferometer 700 can include a beamsplitter 701 with a partial mirror 704, such that light 722 at an input face 702 of the beamsplitter 701 is partially transmitted along a transmitted light path 720 and is partially reflected along a reflected light path 718. The reflected path 718 can include a second surface mirror 706 adjacent to and in contact with a surface 708 of the beamsplitter 701. Light reflected from partial mirror 704 can further be reflected back toward the partial mirror 704 after traversing the thickness of the second surface mirror 706. The transmitted path 720 can include a second surface mirror 714 adjacent to and in contact with a surface 712 of the beamsplitter 701. Light transmitted by partial mirror 704 can be reflected back toward the partial mirror 704 after traversing the thickness of the second surface mirror 714. The light incident back on the partial mirror 704 from the reflected path 718 and transmitted path 720 can be partially transmitted and partially reflected so as to generate output light beams 724a and 724b. The output light beams 724a, 724b can have a sinusoidal dependency on wavelength, similar to that described below for the forward and reverse output beams of the monolithic Michelson and Fabry-Perot interferometers.

In the configuration of the monolithic interferometer 700, the mirror bonding surfaces 708 and 712 may be substantially parallel to the beam splitting surface 704, which may provide fabrication advantages. For example, the parallel surfaces may be manufactured more precisely at a lower cost. Moreover, while the entrance and exit surfaces may have large angles, they can be fabricated without tight tolerances. Another advantage is that the output beams are conveniently branched for integration and application. The materials for the monolithic Mach-Zehnder interferometer may be selected in accordance with the teachings above, i.e., to provide field compensation, thermal compensation, and/or matched CTEs.

FIGS. 8A-8B highlight an assembly process for the monolithic interferometers. In particular, assembly of interferometer 500B of FIG. 5B is illustrated; however, the teachings are applicable to the other interferometers illustrated in FIGS. 4-7 as well. The assembly process is based on that described in International Publication No. WO 2009/126546, published Oct. 15, 2009 and entitled "High-Precision Monolithic Optical Assemblies and Methods for Fabrication and Alignment Thereof," which is hereby incorporated by reference herein in its entirety. As described therein, the second surface mirrors 406 and 514 may be wedge-shaped with a slight angle in the range of a few arc minutes in angular tolerance. By rolling the second surface mirrors with respect to the beamsplitter 401, a precise alignment solution for the interferometer can be achieved that is better than the tolerances of any or all of the components of the interferometer.

As shown in FIG. 8A, a cube beamsplitter 401 is in surface contact with the two second surface mirrors 406 and 514. The real and imaginary surface normal vectors are shown in FIG. 8B. When the two mirrors 406 and 514 are rolled (i.e., rotating one component with respect to another component about a surface normal of the contact surface between the two components) about their respective contact surfaces, the mirror surface normal vectors N' and N" will revolve around O' and O". The radii of the circles are the wedge angles of the mirrors (i.e., $\theta_1$ and $\theta_2$) and the separation between the centers is equal to the wedge angle (i.e., $\beta$) between the real and imagery surfaces of the beamsplitter. If the conditions $\theta_1+\theta_2>\beta$, and $\theta_1-\theta_2<\beta$ are both satisfied, the two virtual circles intersect at two points. Thus, the mirrors 406 and 514 can be perfectly aligned to produce a featureless interference pattern. Alternatively, the mirrors 406 and 514 can also be arranged to generate specific parallel line interference patterns. In essence, this alignment method takes advantage of the high flatness of the conventional optical components such that a very precise angular adjustment can be achieved by a rolling adjustment of much less precision. Because the flat surface joining position is very stable, the assembly and bonding of the components can be readily performed without affecting the alignment.

Figure 9:
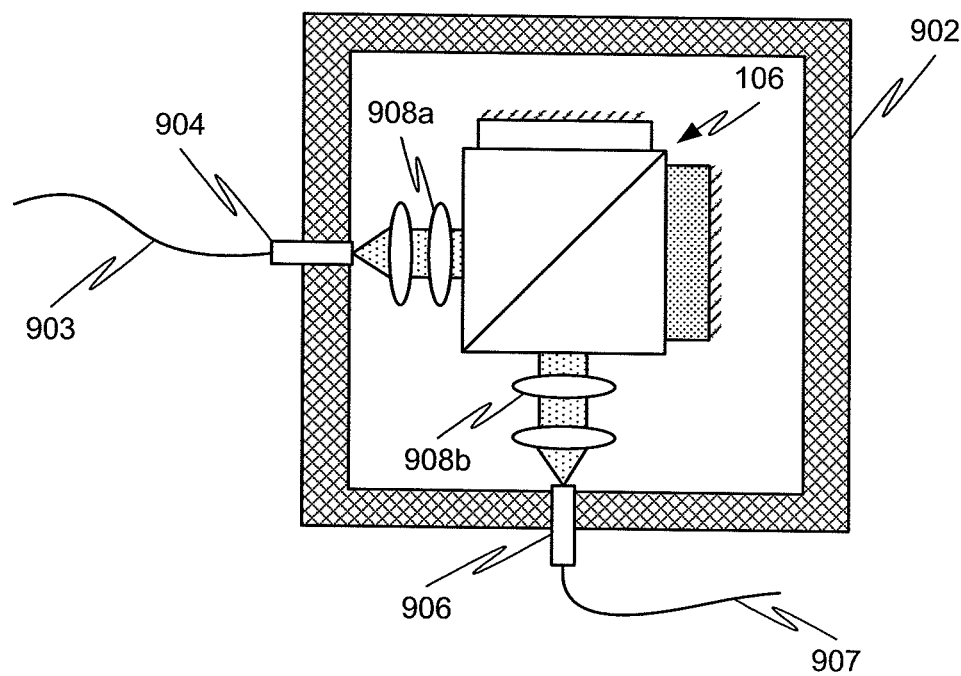
FIG. 9 shows a monolithic interferometer with environmental enclosure, according to one or more embodiments of the disclosed subject matter.

Referring to FIG. 9, a configuration of a stable interferometer 106 with thermal enclosure 902 for use as a standalone wavelength reference is shown. In FIG. 9, the interferometer 106 is a Michelson interferometer; however, other interferometer configurations, as described herein, are also possible according to one or more contemplated embodiments. The thermal enclosure 902 can be passively thermally isolated or actively temperature controlled. An input waveguide 903 can couple light from a light source (not shown) to an input 904 to the thermal enclosure 902. Light processed by the interferometer 106 can be transmitted to an optical system for further processing or use by an output waveguide 907 coupled to output 906 of the thermal enclosure 902. For example, input waveguide 903 and output waveguide 907 can be optical fibers having a core size of approximately 110 µm diameter. Although optical waveguides are illustrated in FIG. 9, free space optics may alternatively be used for all or part of the optical system.

The temperature controlled enclosure 902 can maintain a desired temperature, for example, to within 0.01° C. precision, such that the repeatability in wavelength calibration is on the order of magnitude of $10^{-8}$. In the absence of a thermal enclosure, the wavelength calibration sensitivity may be reduced, for example, on the order of $10^{-6}$ in a typical lab environment. One or more optical components 908a, 908b may be inserted in the optical path between the input and output waveguides. Such optical components 908a, 908b may include, but are not limited to, lenses, polarizers, and wavelength filters. For example, if there is a concern that the interferometer may exhibit birefringence (or double refraction), a polarizer can be used to eliminate any OPD drift that may occur due to the polarization state of the light source being unstable.

A distinction between a standalone interferometer and an interferometer product as a wavelength standard, as described herein, is that the latter provides certified, repeatable high-precision spectral data at multiple wavelengths over a wide wavelength range. Moreover, there can be at least one data point within this wavelength range at which the wavelength precision, $\Delta\lambda/\lambda$, is smaller than $10^{-5}$. Simultaneously, the precision of the OPD of the interferometer, $\Delta OPD/OPD$, (or the precision in the free spectral range (FSR) of an Etalon) can be smaller than $10^{-4}$ over the entire wavelength range. For example, in the C-band for fiber optic communications (e.g., from approximately 1530 nm to approximately 1565 nm), one spectral peak of an Etalon can be measured as 1530.00±0.01 nm. The error in FSR can contribute a negligible maximum error of 3.5 pm, such that, at the other end of the C-band (e.g., near 1565 nm), the wavelength of another spectral peak can be determined with the same precision of ±0.01 nm. Thus, reference data generated using the disclosed interferometers can have a wavelength precision less than $10^{-5}$ at at least one data point within the measured wavelength range and less than $10^{-4}$ over the entire measured wavelength range.

For a Michelson interferometer such as interferometer 500B, the intensity of the output beams is a sinusoidal function based on optical frequency:

$$I_t(v) = \frac{1+\cos\varphi}{2}, \quad (13)$$

$$I_r(v) = \frac{1-\cos\varphi}{2}, \text{ and} \quad (14)$$

$$\varphi = \frac{2\pi v D}{c}, \quad (15)$$

wherein the subscript t represents the transmitted (forward) output beam 424, the subscript r represents the reflected (reverse) output beam 430, $\varphi$ is the phase angle, $v$ is the optical frequency, D is the OPD of the interferometer, and c is the speed of light in the interferometer. If the interferometer is configured to be dispersion free, then D can be a constant. In general, D is a weak function of the optical frequency. A more precise value of D may be obtained by using the group delay of the interferometer $$\frac{1}{2\pi}\frac{d\varphi}{dv}.$$

The phase angle as a function of optical frequency can be characterized using a standard spectrometer, such as a high precision Fourier Transform Spectroscopy instrument. After the characterization, the optical frequency response of an arbitrary spectrometer device can be precisely calibrated by comparison of its output phase data with the already calibrated phase data. Note that the characterization by the reference spectrometer can further provide a precise measurement of the group delay of the interferometer OPD.

Figure 10:
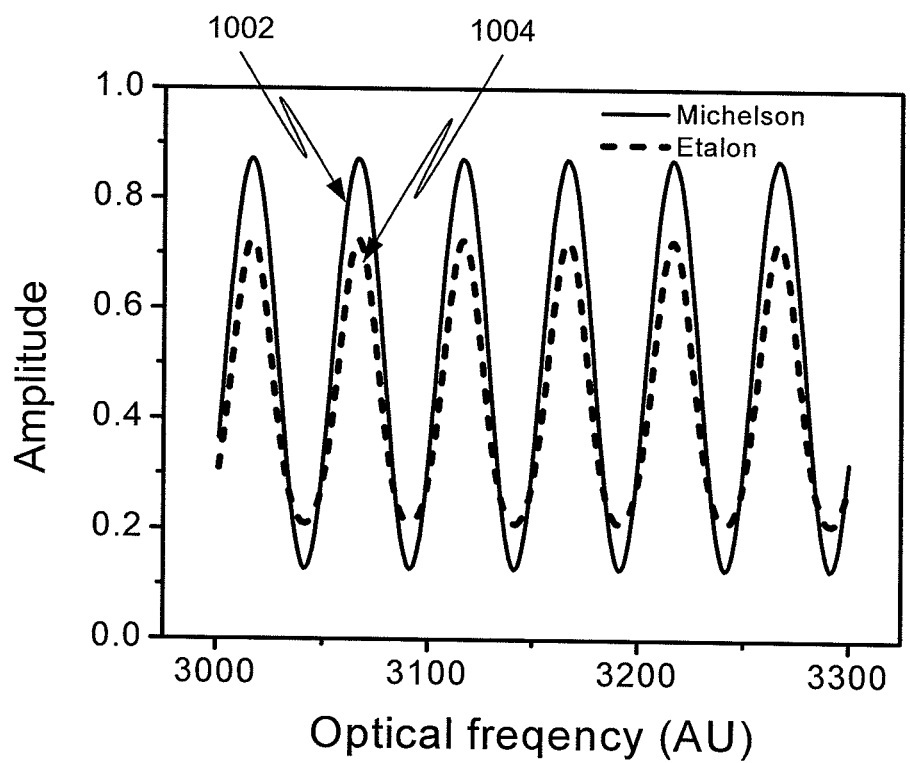
FIG. 10 is a graph illustrating the spectral data obtained for a monolithic Michelson interferometer and a monolithic Fabry-Perot interferometer based on a white light input.

For improved sensitivity in wavelength calibration, an interferometer with an OPD matching the spectral resolution of the calibrating instrument may be chosen. Assuming the point spread function (PSF) of the calibrating instrument has a Gaussian distribution, an optimized OPD, $D_{optimized}$, can be determined as:

$$D_{optimized} \approx 0.37 \frac{\lambda^2}{\Delta\lambda}, \quad (16)$$

wherein $\Delta\lambda$ is the full width at half maximum (FWHM) of the Gaussian distribution. A compromise may thus be needed between the degree of modulation visibility and the number of modulation cycles for an optimized OPD. For example, at an optimized OPD, the modulation visibility may be ~60%, as shown in FIG. 10.

For a Fabry-Perot interferometer 600, the frequency response of the transmitted beam 612 is significantly more complex than that of a Michelson interferometer. For example, the transmittance, T, is given by:

$$T = \frac{(1-R)^2}{1+R^2-2R\cos\varphi} \quad (17)$$

wherein R is the mirror reflectance, when both mirrors have the same value.

Commercially available Fabry-Perot Etalons are typically either high finesse with R>90%, or low finesse with R<20%. The low finesse Etalons offers advantages in low cost and simplicity. However, in order to calibrate a spectral instrument to a high degree of sensitivity, it may be preferable that the mirror reflectance be approximately 40% in the Etalon. For example, if the mirror reflectance is approximately 40% and if the FSR of the Etalon matches the spectral resolution of the calibrated instrument, the spectral response of the Etalon may degenerate into a sinusoidal response similar to that of a Michelson interferometer. As illustrated in FIG. 10, the frequency response 1002 as a function of wavelength for a stable Michelson interferometer with a white light source input can be sinusoidal. In comparison, the frequency response 1004 as a function of wavelength for a stable Fabry-Perot Etalon at a mirror reflectivity of about 40% with a white light source input can mimic the sinusoidal response of the Michelson interferometer, but at a reduced amplitude.

However, even with such a configuration for the Etalon, the ultimate sensitivity of an optimized monolithic Michelson interferometer as described herein may still be several times greater. For example, the sensitivity attainable with the monolithic Michelson interferometer may be at least three times better than that attainable with the optimized Etalon. When compared with a low finesse Etalon (i.e., R<20%) or high finesse Etalon (i.e., R>90%), the sensitivity attainable with the monolithic Michelson interferometer may be on the order of at least ten times better than that attainable with an Etalon. Moreover, because of the simple sinusoidal frequency response of the Michelson interferometer, the phase interpretation can be very convenient such that the accuracy can be determined by the sensitivity limit. In contrast, the phase interpretation of an Etalon can be more complicated since it is strongly coupled with the symmetry of the PSF of the applied spectral instrument. It may not be trivial to achieve a sensitivity limit when the PSF is not symmetric. Accordingly, a Michelson interferometer may be more compatible with various spectral instruments for high-precision calibration.

Although many different interferometer configurations may be used according to the disclosed embodiments, a Michelson interferometer may have certain advantages over other interferometers, especially with regard to the Fabry-Perot Etalon. For example, the wavelength coverage of a typical Etalons can be limited due to the requirement for near lossless mirror coatings. In contrast, coating loss may not be as big of a concern in Michelson interferometer, so that the wavelength range can be greatly expanded. A Michelson interferometer can be made wide angle because of field compensation, so the phase shift is insensitive to the angular alignment of the light source. In contrast, the field angle of an Etalon is very small, so the operation may necessitate a diffraction-limited collimated beam at exactly the right incidence angle, and the phase angle stability may be sensitive to the beam tilting. In other words, the Michelson interferometer can be more stable than an Etalon for certain applications, assuming the mechanical stabilities of the environment are comparable. Also because of the field compensation advantage, the Michelson interferometer may have a much higher throughput than Etalon. As such, monolithic Michelson interferometers, as described herein, may be particularly attractive in weak light applications where the beams are not diffraction-limited.

Figure 11:
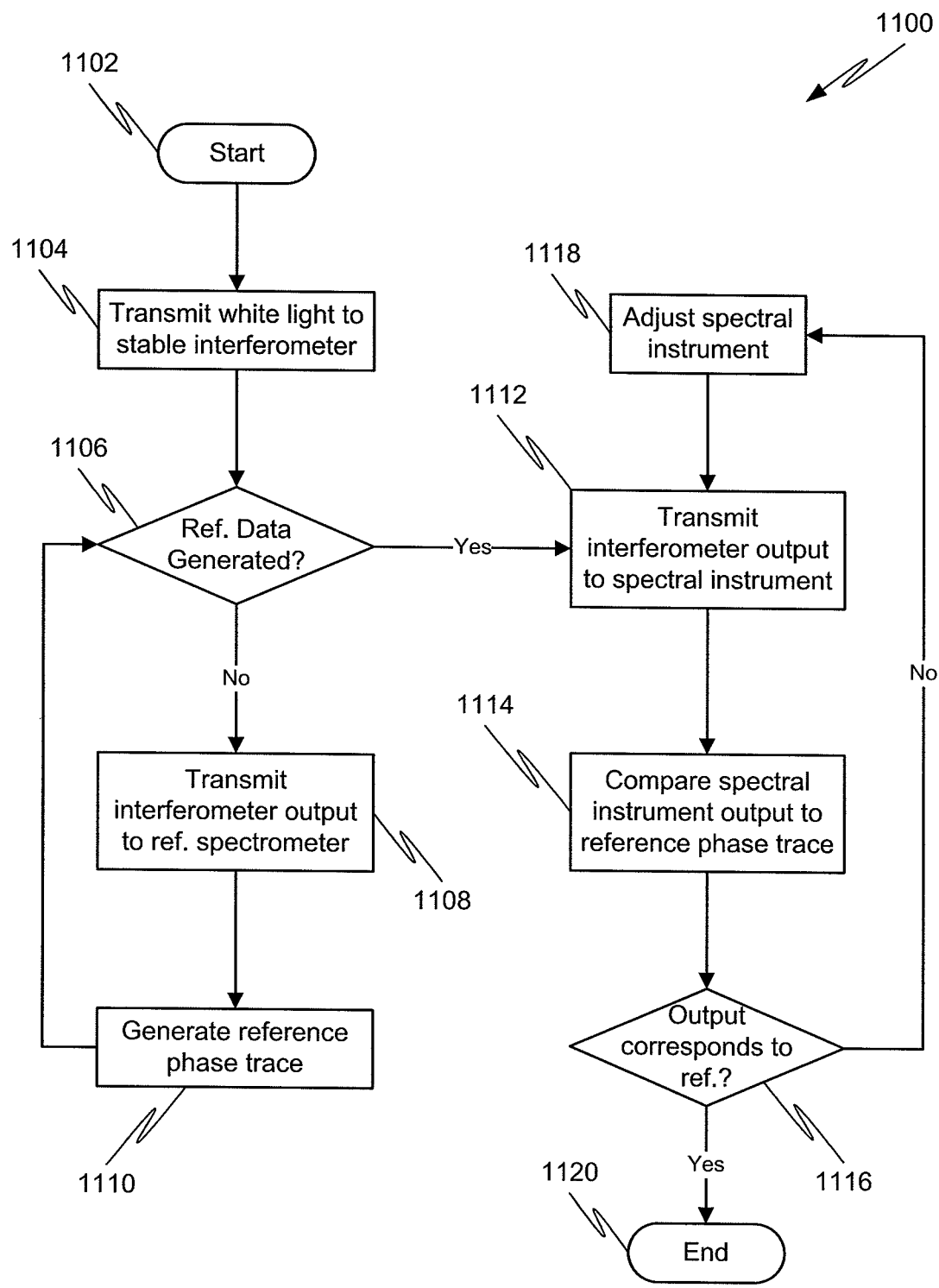
FIG. 11 is a process flow diagram of a wavelength calibration process, according to one or more embodiments of the disclosed subject matter

Referring to FIG. 11, a flow diagram for a process 1100 for wavelength calibration of a spectral instrument is illustrated. The process 1100 may begin at step 1102 and proceed to step 1104. In step 1104, white light can be transmitted to a stable interferometer, such as, but not limited to, the stable interferometers illustrated in FIGS. 4-7. Light output from the interferometer can have an intensity variation as a function of wavelength (i.e., a periodic wavelength-modulated light output) that is dependent on the OPD of the interferometer.

At step 1106, a determination can be made if reference data has been previously generated for the interferometer. The reference data may be a characterization of the light output from the interferometer when subjected to white light from a stable white light source. Such reference data may include a phase trace as a function of optical frequency, e.g., $\phi(v_R)$, wherein $v_R$ is the optical frequency reading of the reference spectrometer. If the reference data has not yet been generated, the process 1100 proceeds to step 1108. At step 1108, the interferometer output can be transmitted to a reference spectrometer. Proceeding to step 1110, the reference spectrometer can characterize the interferometer output and can generate reference data, such as a reference phase trace, based thereon. The process 1100 can then proceed to step 1106.

If it is determined in step 1106 that the reference data has already been generated, the process can proceed to step 1112. At step 1112, the interferometer output can be transmitted to a spectral instrument to be calibrated. Proceeding to step 1114, the spectral instrument can generate an output based on the interferometer output. For example, when the spectral instrument is a spectrometer, it may generate an output of intensity versus optical frequency or phase angle versus optical frequency (e.g., $\phi(v^*)$, wherein $v^*$ is the optical frequency reading of the spectral instrument). The spectral instrument output can then be compared with the reference data in step 1114. The relationship between $v^*$ and $v_R$ can then be determined so that the calibrated $v^*$ has improved precision, the precision limitation being as good as that of $v_R$.

Proceeding to step 1116, it can be determined if the spectral instrument output substantially corresponds to the reference data. If there is not sufficient correspondence, the process may proceed to step 1118, wherein the spectral instrument can be adjusted, either optically (e.g., by the use of optical filters) or mathematically (e.g., by appropriate software manipulation), based on the results of the comparison in step 1114. For example, when the spectral response of the spectral instrument does not correspond to the reference data, calculation constants of the spectral instrument may be adjusted based on a regression analysis of the spectral response and the reference data. The process 1100 may then repeat steps 1112-1118, as necessary, until the output of the spectral instrument substantially corresponds to the reference data. When the output of the spectral instrument substantially corresponds to the reference data, the process can then terminate at step 1120. The calibration process 1100 may subsequently be reinitiated at intervals, automatically or by a user, to recalibrate the spectral instrument. Alternatively, the calibration process 1100 may be constantly repeated for a period of time, such as during a measurement period of the spectral instrument.

The stable interferometers described herein may be used in a variety of precision optical instruments. For example, the disclosed monolithic Michelson interferometer can be used as part of an interferometer-based spectrograph instrument for extra-solar planetary discovery and research. Such an instrument may use RV measurement techniques to detect and study extra-solar planets. Oscillations of the Doppler signal of a stellar light spectrum reveal the existence of planets around a target star and the planets' orbital information. The resolution in RV measurements is typically tens of meters per second (m/s) or better. To obtain such resolutions, spectrograph instruments with resolutions better than 50,000 are normally required.

Figure 12:
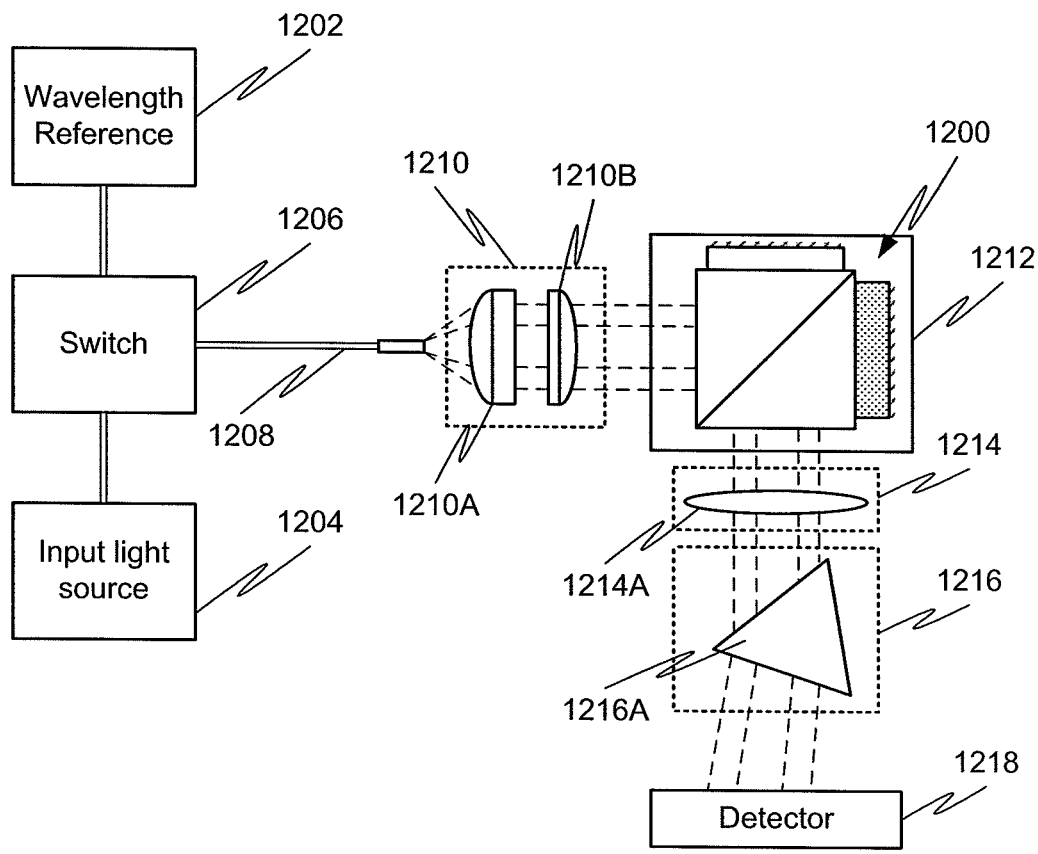
FIG. 12 is a schematic diagram showing an optical setup using a stable interferometer, according to one or more embodiments of the disclosed subject matter.

Referring to FIG. 12, an instrument suitable for the extra-solar planetary discovery and research application is shown. The instrument employs a stable Michelson interferometer 1200 in conjunction with a medium resolution spectrograph. Input light is obtained from a source 1204, such as an observatory or telescope, and conveyed via free space or wave guide optics 1208 to an optical switch 1206, which selectively transmits the input light to an optical system 1210. The optical system 1210, which can include one or more optical components, such as lens 1210A and cylindrical lens 1210B, configures the input light for transmission to the interferometer 1200. The interferometer 1200 may be housed in a thermal enclosure 1212, similar to enclosure 902 described above. The input light interacts with the interferometer 1200 to generate an output beam. The output beam is conveyed from the interferometer 1200 to another optical system 1214, which can include one or more optical components, such as a lens 1214A. The optical system 1214 configures the output light for transmission to an optical system 1216, which can include one or more optical components for dispersion, such as prism 1216A or a grating. The resulting dispersed stellar fringes can then be recorded by a detecting element, such as a 2-D optical detector 1218. The Doppler shift of light from a star can be determined by measuring the interference phase shifts of stellar spectral lines recorded by detecting element 1218. Compared to a traditional high resolution Echelle grating spectrograph, the interferometer based instrument has advantages in high optical throughput, large multiplexing capacity, small size and low cost.

In an RV measurement instrument, the interferometer 1200 can be actively locked at a constant OPD, for example, near 7 mm. In order to actively lock the OPD, the fringe pattern of a wavelength-stabilized reference source 1202, such as a wavelength-stabilized HeNe laser, can be monitored. The information can then be used to correct for variations in the OPD by correcting the position of a movable mirror of the interferometer. Frequent instrument calibrations employing reference spectral lines of gas cells (such as an iodine cell) can be used to separate the instrument drift from the Doppler shift of the observed star light. By fabricating interferometers in accordance with the teachings of the present disclosure, a more stable instrument can be attained as compared to conventional interferometers.

Frequent calibrations can be carried out to remove the low speed instrument drift. A typical observation time for a star target is approximately 30 minutes. The calibration process can take place during a target switching window between observations. Equivalent to the star observation calibration process, a high-pass filter can be applied to the laser phase shift data by setting the cutoff frequency at corresponding calibration frequencies. Table 2 shows the residual RMS errors at different calibration frequencies. One calibration per 30 minutes is appropriate, and the 1.4 m/s RMS error is comparable to or smaller than the typical photon limit of instrument operation and observation design.

TABLE 2

Estimates of RV errors for various calibration cycle times.

| Calibration cycle (min) | RV error, RMS (m/s) |
|---|---|
| 15 | 1.2 |
| 30 | 1.4 |
| 60 | 1.7 |
| 120 | 2.4 |
| 300 | 4.6 |

With regard to the monolithic Michelson interferometers described herein, a first step in the fabrication may include selecting and designating appropriate beamsplitters. For example, a desired commercial BK7 beamsplitter can achieve a 50/50 unpolarized splitting. Bonding surfaces of the beamsplitter may be uncoated while the entry and exit surfaces can include anti-reflection (AR) coatings. Because of the interference between the Fresnel reflections of the two uncoated surfaces, the beamsplitter itself is a stable high contrast Michelson interferometer with a short OPD. Since the projections of the two uncoated surfaces may include a slight angular misalignment from an absolute parallel relationship, parallel interference fringe lines are present if a collimated laser beam illuminates the beamsplitter. For example, at 632.8 nm illumination wavelength, the fringe spacing may be larger than 0.1 mm; however, a fringe spacing of 1 mm or larger may be desirable depending on the application.

Figure 13:
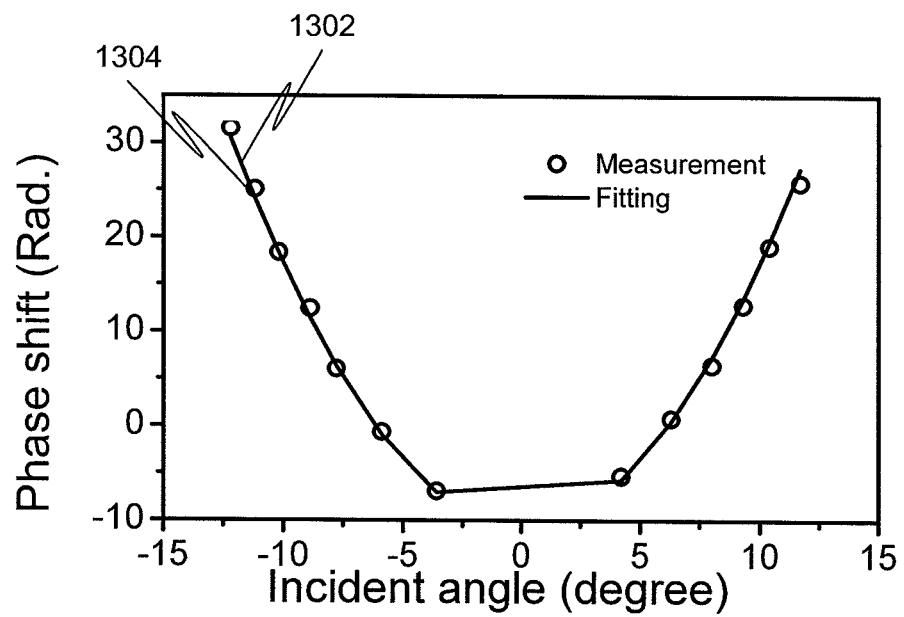
FIG. 13 is a graph illustrating phase shift, in radians, as a function of incident angle on a beamsplitter of a monolithic interferometer.

The corresponding tilt angle between the two uncoated surfaces of the beamsplitter can be precisely determined to less than one arc second from the interference pattern. The thickness difference between the two arms of the beamsplitter can be less than 150 μm. This thickness difference also needs to be precisely measured. To determine the center thickness difference, the angle resolved phase shift of the interference fringe pattern can be measured. By changing the incident angle of the collimated laser beam, i, the phase shift is given by $$\phi = \frac{2\pi n \Delta \cos j}{\lambda} \quad (18)$$

wherein n is the refractive index of the beamsplitter, Δ is the thickness difference between the two arms, j is the refraction angle in beamsplitter (i.e., sin j=sin i/n), and λ is the wavelength. FIG. 13 shows the phase shift measurements 1302 at the center portion of a beamsplitter. In this example, the center thickness difference is determined to be 142 μm, which provides the best fit curve 1304 according to Eq. (18). The precision of this measurement method is estimated to be about +/−5 μm.

A pair of second surface mirrors can be manufactured specifically for a designated beamsplitter, so accurate alignment and field compensation can be achieved for a monolithic Michelson interferometer. In order to align to the desired interferometer fringe pattern, which may have a 2.5 mm fringe spacing at 632.8 nm with fringes that are parallel to the plane of the beam propagation, the manufactured second surface mirrors can have tilt angles to compensate for any misalignment of the beamsplitter surfaces. The angular alignment tolerance may be less than 3 arc seconds, and second surface mirrors with required wedge angles can be readily manufactured. In order to achieve wide angle performance for the interferometer, the thicknesses of the second surface mirrors can be controlled such that the thickness imbalance of the beamsplitter can be well compensated. The thickness tolerance of the mirrors may be +/−10 μm. Combining the thickness measurement error of the beamsplitter, the overall thickness tolerance can be less than +/−25 μm. Significant advantage may be realized by employing the assembly process described in International Publication No. WO 2009/126546, previously incorporated herein. In particular, the second surface mirrors may be wedge-shaped with a slight angle in the range of a few arc minutes in angular tolerance. By rolling the second surface mirrors with respect to the beamsplitter, a precise alignment solution for the interferometer may be achieved.

Optical contact can be an effective technique for bonding between the glass components for high stability and security. Ultra-violet (UV) glue bonding can also be used to attain better control in the bonding process. With the UV glue bonding technique, the glue layer can be a few microns in thickness, and the wedge angle of the glue layer can be less than two arc seconds. Following a UV curing process, the interferometer can be baked overnight at 55° C. for complete curing. Because of the thermally homogeneous design of the monolithic Michelson interferometer, misalignment due to thermal effects may be reduced and/or minimized after the baking process.

Such construction techniques have been used to construct a 7 mm OPD monolithic Michelson interferometer with a clearance aperture of 165×33 mm. The large clearance aperture allows the instrument to observe, for example, 120 beams simultaneously. Other numbers of beams simultaneously observed may also be possible according to one or more contemplated embodiments. In addition, a monolithic Michelson interferometer having a 10 mm OPD and a 50 mm diameter clearance aperture has also been fabricated. These two interferometers have a wide wavelength coverage, for example, from 400 nm to 700 nm.

Figure 14:
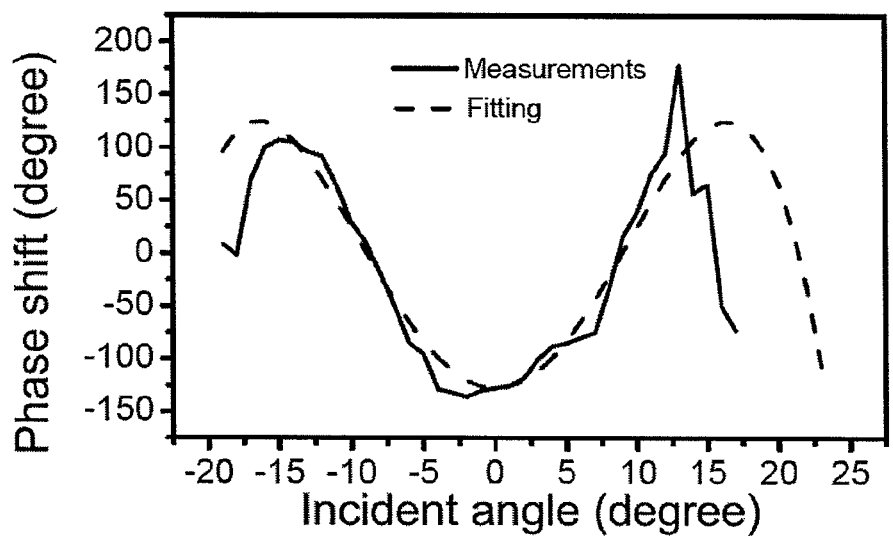
FIG. 14 is a graph illustrating phase shift, in degrees, as a function of incident angle on a monolithic interferometer.

Field compensation can be examined by measuring the angle resolved interferometer phase shift, which is similar to the technique in the thickness difference measurement of a beamsplitter. FIG. 14 shows the measurement results of a 10 mm OPD monolithic Michelson interferometer. The precision in phase shift measurements is mainly constrained by the difficulty in tracking and observing the exact same interferometer location while turning the interferometer body. An optimal curve fitting occurs if the BK7 mirror thickness is 15 μm thicker than the nominal thickness. The π shift full range field angle of the interferometer is 22°, which far exceeds the typical 6° requirement of certain RV measurement spectrographs. The visibility of the laser interference is nearly 100% within the small incident angle region. Clear interference fringes under the illumination of an extensive mercury lamp light source are possible and demonstrate the wide field capability of the monolithic interferometer.

In some applications, it may be advantageous to construct a monolithic interferometer with a non-zero thermal sensitivity. For example, according to one or more contemplated embodiments, materials and configurations for the disclosed monolithic interferometers may be selected to maximize the thermal sensitivity in a particular wavelength range or at a particular wavelength. Such a monolithic interferometer may thus serve as an optically-interrogated power independent temperature sensor. Although such a constructed interferometer may be bulky and relatively slow in temperature response as compared to other temperature sensors (e.g., thermostats or fiber optical sensors), an appropriately constructed monolithic interferometer serving as a temperature sensor may be advantageous if remote or free space optical detection is necessary. Such applications may include, but are not limited to, wireless, power-free, cryogenic, or vacuum operations or combinations thereof. In such a configuration, the interferometer may be field compensated and/or made of materials with matched CTEs. The wide-field capability of the monolithic interferometer may enhance the optical performance in remote sensing application.

Macro-scale thermal compensation may not be completely perfect due to inhomogeneous temperature distribution in the monolithic interferometer such that an OPD drift exists. Calibration at a single temperature to compensate for any OPD drift over time may thus be inaccurate. To account for potentially incomplete calibration due to thermal variations, a sensing beam, which shares a common input path to the interferometer as a signal beam, may be used to sense any change in the OPD due to temperature. The OPD drift in signal beam due to the thermal variations in the interferometer can then be corrected. In such a configuration, the interferometer may be designed and constructed in view of the teachings herein to have a variable thermal sensitivity. For example, the thermal sensitivity of the interferometer can be designed low at the designed signal wavelength, but at a sensing wavelength different from the signal wavelength, the thermal sensitivity can be designed significantly higher. Thus, changes due to temperature can be readily observed at the sensing wavelength and accounted for in the calibration at the signal wavelength. The interferometer can also be designed to have a birefringence in thermal sensitivity for polarization multiplexing.

Figure 15:
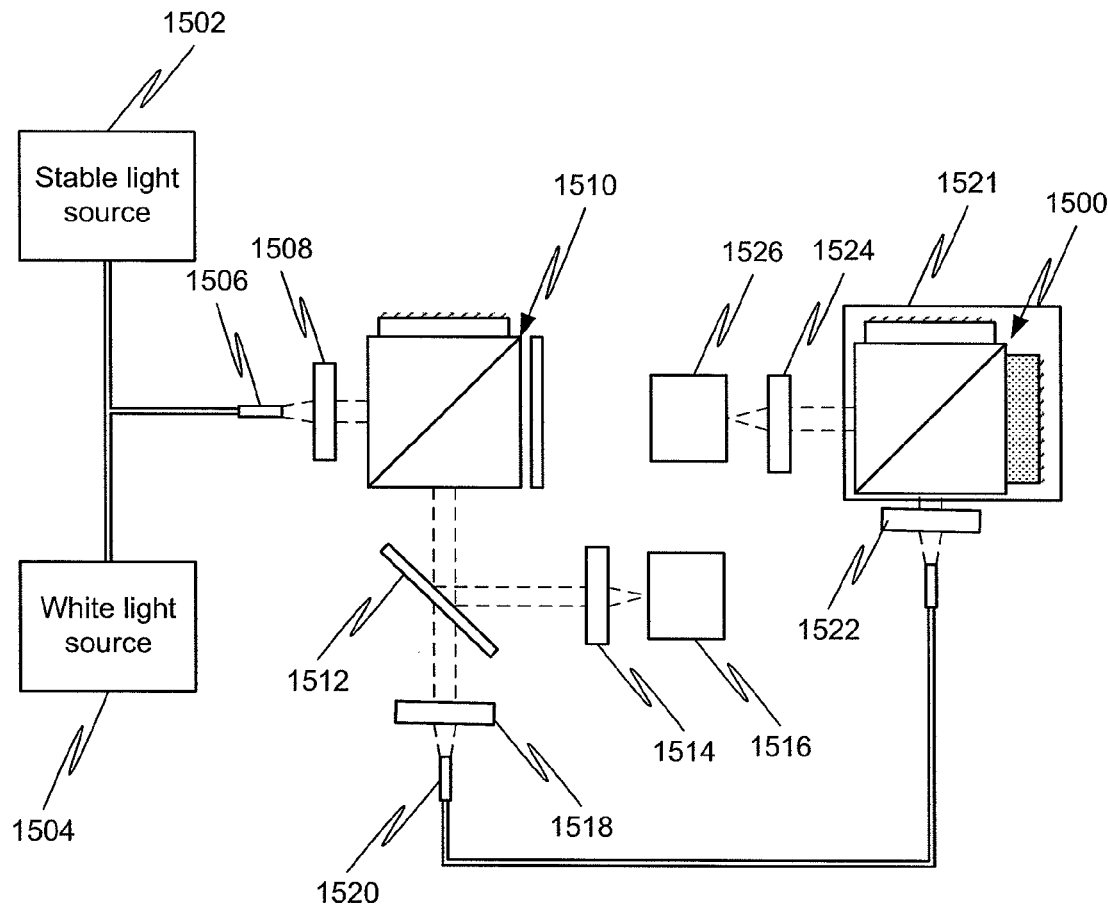
FIG. 15 is a schematic diagram showing an optical setup for monitoring phase shift of a monolithic interferometer using a scanning interferometer, according to one or more embodiments of the disclosed subject matter.

A setup for monitoring temperature-based OPD drift of a monolithic interferometer is shown in FIG. 15. The monolithic interferometer 1500 may be housed in a temperature-controlled enclosure 1521. Input to and output from the interferometer can be through optical waveguides, such as multimode fibers, or through free space. A wavelength stabilized source 1502, such as a He—Ne laser at 632.8 nm, and a white light source 1504, such as a tungsten lamp, are coupled to an input waveguide 1506, such as multimode fiber. Optical system 1508 may be provided to configure the mixed light beam from the waveguide 1506 for input to a scanning interferometer 1510. The exiting beam from the scanning interferometer is split by an optical component 1512, such as a notch filter or dichroic mirror, such that a reference channel 1516 detects the laser interference signal. White light is transmitted through component 1512 to the input surface of the interferometer 1500. White light from optical component 1512 can be coupled via optical system 1518 to another waveguide 1520 for transmission to the monolithic interferometer 1500. Optical system 1508 and 1518 may include lenses, filters, or other optical components.

White light from waveguide 1520 is directed to the input of the monolithic interferometer 1500 via optical system 1522, which may include lens, filters, or other optical components. The output beam from the monolithic interferometer 1500 can be delivered to a signal detecting channel 1526 via optical system 1524, which may include lenses, filters, or other optical components. The reference signal allows resampling of the white light interferogram signal such that accurate Fourier processing can be used to determine phase angles over the detector's bandwidth, for example, from approximately 400 nm to approximately 1200 nm. Operation of the scanning interferometer 1510 and temperature control of the enclosure 1521 for the monolithic interferometer 1500 may be controlled by a controller (not shown) to ascertain the dependence of the OPD drift of the monolithic interferometer based on temperature.

Figure 16:
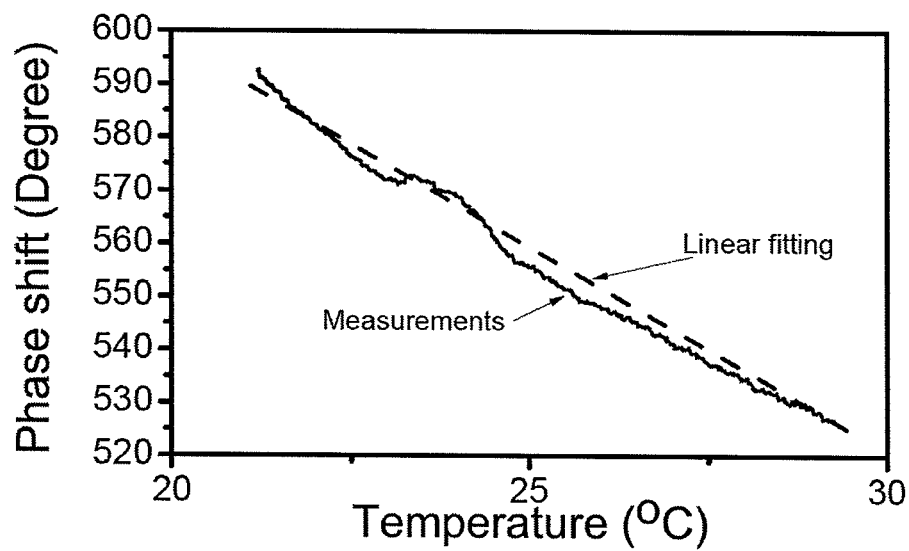
FIG. 16 is a graph illustrating phase shift, in degrees, as a function of temperature.
Figure 17:
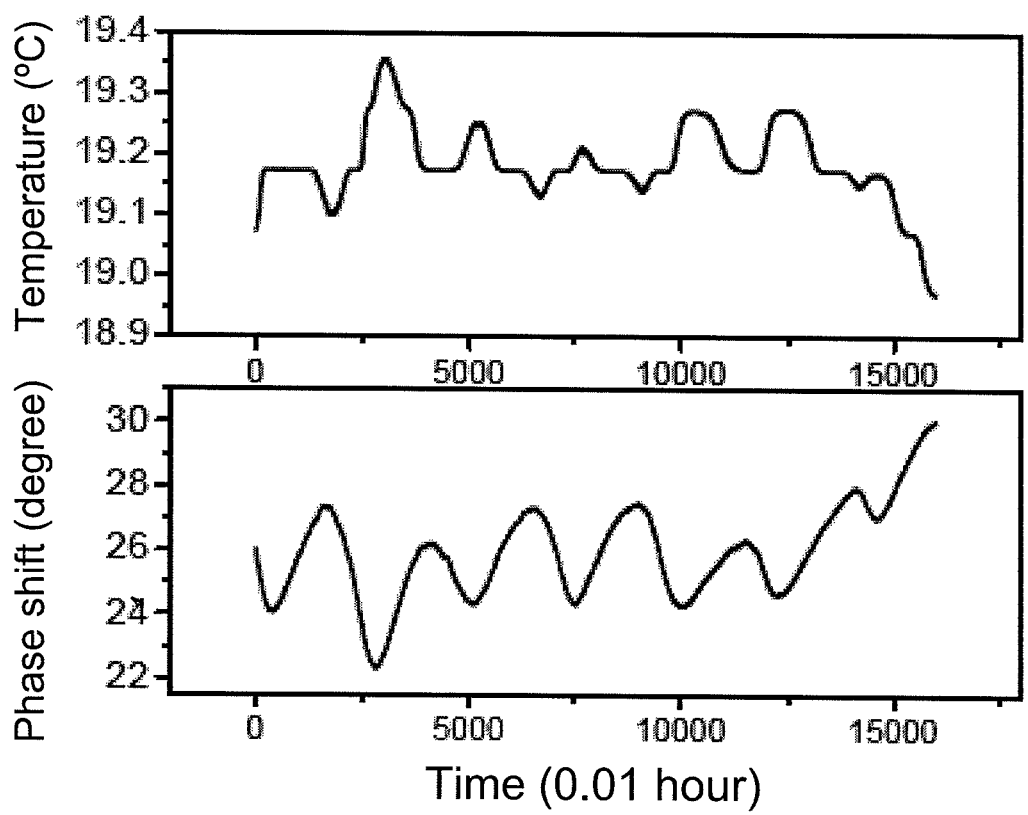
FIG. 17 shows graphs of variations in temperature and phase shift, in degrees, of a monolithic interferometer as a function of time.

FIG. 16 shows the monitored phase shift of a 7 mm OPD interferometer during a cooling process. The hysteresis in measurements can be attributed to uneven temperature changes. By comparing with the monitored temperature, the linear thermal sensitivity is determined to be $-1.7 \times 10^{-6}/°$ C., which is only slightly worse than the designed value of $-1.2 \times 10^{-6}/°$ C. (based on material selection and dimensions). The measured result is equivalent to approximately 500 m/s/° C. in an RV measurement application. FIG. 17 shows the continuous monitoring results of phase shift and interferometer temperature over several days. Data was recorded at a rate of 100 points per hour. The phase shift closely correlates with temperature, and there is an obvious daily oscillation pattern. The overall peak to valley phase shift corresponds to approximately 500 m/s in an RV measurement application and a daily peak to valley range of approximately 200 m/s. The monitored phase shift was suspected to be significantly affected by instabilities of the laser beam steering and the CCD camera position, which was also coupled with phase calculation errors. Therefore, the monitored phase shift results serve as a very conservative estimate of the intrinsic interferometer stability.

In embodiments discussed herein, the monolithic interferometers may be designed to minimize the thermal sensitivities while maintaining a wide-field capability. However, it is also possible to sacrifice one of the compensations in favor of the other to particular advantage in certain applications. For example, the wide-field capability of an interferometer may be sacrificed or limited so as to obtain an extremely low thermal sensitivity over a wavelength range or at a desired wavelength. By such a configuration, an OPD for the interferometer can be obtained which is very stable with respect to temperature.

For example, a monolithic Michelson interferometer can be constructed in the configuration of FIG. 5B. Beamsplitter 401 may be a broadband, two-inch cube formed from BK7 glass. Second surface mirror 406 may also be made from BK7 glass while second surface mirror 514 may be made from LAK7 glass. The mirrors and beamsplitter may be permanently bonded together in optical contact. As discussed above, the wedge angles of the beamsplitter and mirrors as well as their relative orientations can be carefully controlled during fabrication to achieve a near perfect alignment of the interferometer surfaces.

To minimize, or at least reduce, the sensitivity to input light beam position, the center region of the two-inch diameter clearance aperture of the beamsplitter can be used. To minimize, or at least reduce, the thermal sensitivity of the interferometer the size of the second surface mirrors can be selected to sacrifice field compensation in favor of more complete thermal compensation. However, field compensation may still be necessary because variations due to beam input angle may also need to be minimized. Therefore, it may be desirable to only slightly sacrifice field compensation in favor of thermal compensation.

The thermal sensitivity of the monolithic Michelson interferometer can be determined by rewriting Eq. (12) as:

$$S_T = \frac{\left(\frac{dn_1}{dT} + \alpha_1 n_1\right) * L_1 - \left(\frac{dn_2}{dT} + \alpha_2 n_2\right) * L_2}{n_1 L_1 - n_2 L_2}, \quad (19)$$

wherein L, n, and α represent the mirror thickness, the refractive index, and the CTE of the respective mirror, the subscript 1 refers to the first mirror made from LAK7, and the subscript 2 refers to the second mirror made from BK7.

The field compensation equation for the monolithic Michelson interferometer is given by:

$$L_1 = L_2\left(\frac{n_1}{n_2}\right) + \delta, \quad (20)$$

wherein δ represents the tolerable departure from the ideal field compensation. The interferometer sensitivity to beam angle is based on δ and can be given by:

$$S_A = \frac{\delta * \cos J}{n_1 L_1 - n_2 L_2}, \quad (21)$$

wherein J is the beam angle in the LAK7 mirror.

The input light beam to the monolithic interferometer should be aligned such that the beam angle J is as small as possible; however, the angular sensitivity cannot be ignored due to finite beam converging angle and aiming drift. By increasing δ slightly from its normally zero value, the angular sensitivity can be kept low while allowing the mirror thicknesses to be tailored for reduced thermal sensitivity. For example, if the instability of an input beam is 1 μm, the resulting angle-dependent instability will be approximately $8 \times 10^{-11}$.

Based on the tolerable angle-dependent instability, appropriate selection of the thicknesses of the second surface mirrors can be determined such that the thermal sensitivity at particular wavelengths is reduced or even eliminated. Such a monolithic Michelson interferometer was constructed and tested in the setup of FIG. 15. The LAK7 second surface mirror had a thickness of 8.9 mm while the BK7 second surface mirror had a thickness of 7.9 mm.

Figure 18:
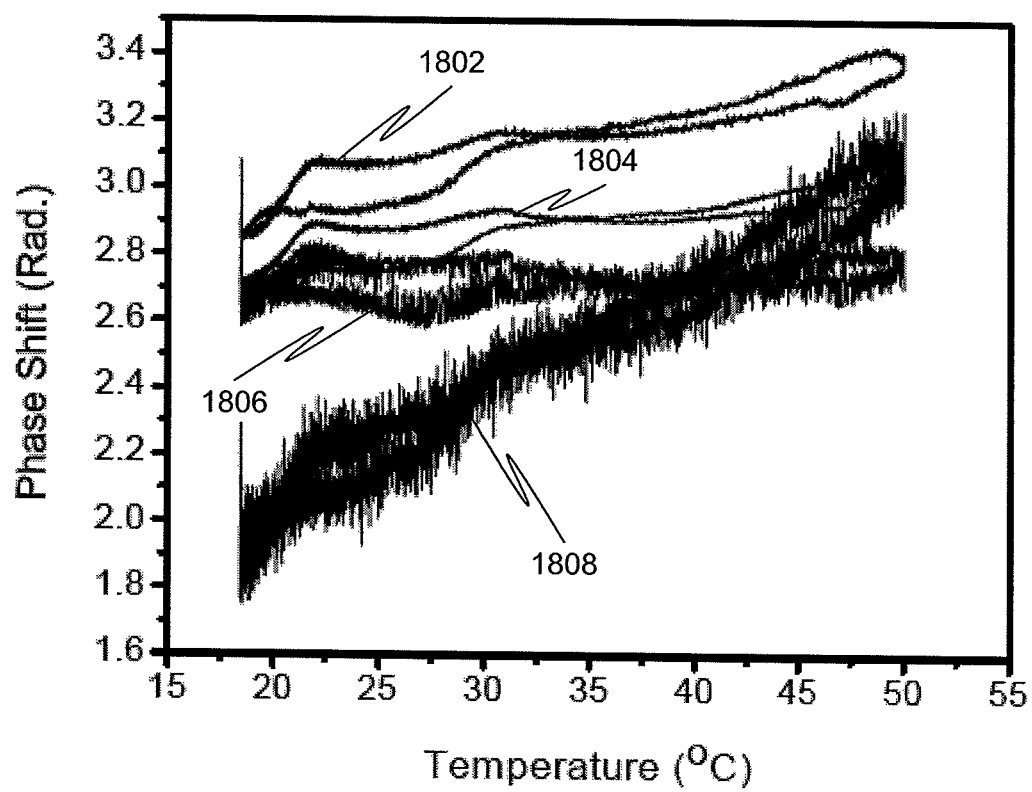
FIG. 18 is a graph illustrating phase shift, in radians, as a function of temperature for a monolithic interferometer at different light wavelengths.
Figure 19:
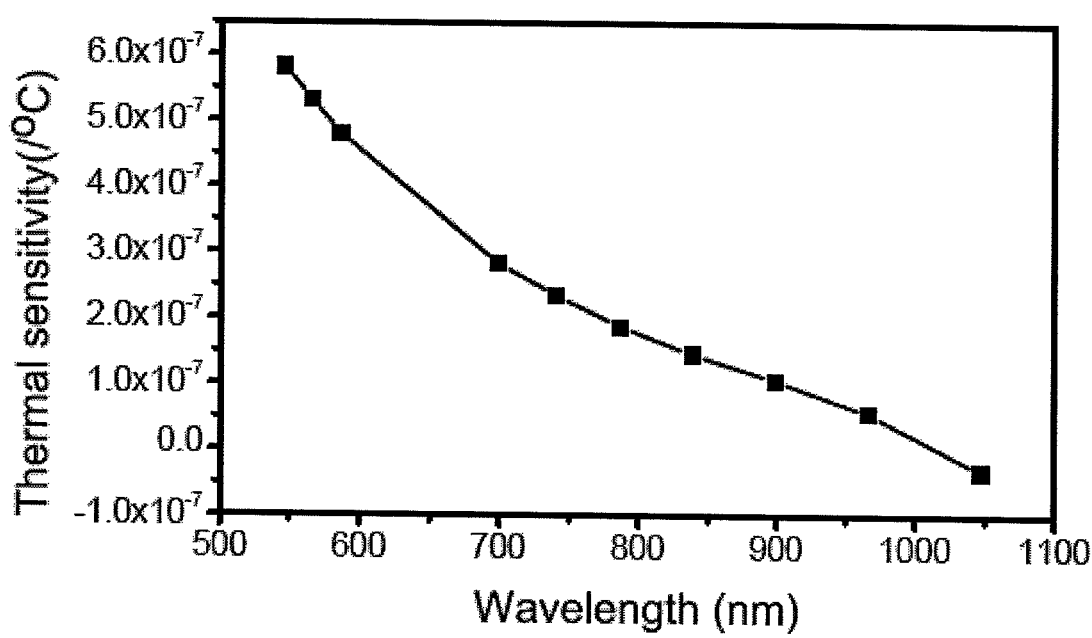
FIG. 19 is a graph illustrating thermal sensitivity of a monolithic interferometer as a function of light wavelength.

The phase shifts of the monolithic Michelson interferometer were measured over a wavelength region from approximately 500 nm to approximately 1100 nm during a heating/cooling process between 18° C. and 50° C. FIG. 18 shows four curves 1802, 1804, 1806, and 1808 at selected wavelengths of 700 nm, 790 nm, 970 nm, and 565 nm respectively. In general, the phase shift of the interferometer has a substantially linear dependence on temperature. Deviations from the linear relationship are a function of the instability of the scanning interferometer used in the test setup. Using linear regression, the thermal sensitivity at different wavelengths can be ascertained. FIG. 19 shows the derived thermal sensitivity of the monolithic Michelson interferometer at different wavelengths. In particular, the thermal sensitivity of the phase shift of the monolithic interferometer decreases from approximately $6 \times 10^{-7}/°$ C. at 550 nm to approximately 0 near 1000 nm.

Embodiments of the disclosed monolithic interferometers can be more compact and intrinsically more stable than conventional interferometers as they have fewer individual components. Moreover, the components can be suitable for miniaturization, which may not be available to conventional interferometer designs. Such a miniaturization potential makes the disclosed monolithic interferometers suitable for small scale and micro applications, such as, but not limited to fiber-optics, optical MEMS, and integration with Lab-on-a-Chip devices. In addition, the disclosed interferometers are also suitable for large OPD applications.

In the disclosed embodiments, it has been implied that the optical surfaces (e.g., mirror surfaces) are flat and substantially parallel. However, it is not required that the optical surfaces be flat and/or substantially parallel. Rather, other geometries for the mirror surfaces are also possible according to one or more contemplated embodiments. For example, the second mirror surface in the interferometers can be tilted, curved, stepped, or multiple-stepped with a constant or varying pitch and/or depth. A grating surface may also be employed, which would be analogous to a multiple-stepped surface with a very constant and fine pitch at a constant step depth. Such configurations may be helpful in achieving a desired interference pattern. Moreover, the reflective surfaces for the mirror elements of the interferometer can be achieved in any manner known in the art, such as, but not limited to, metal or dielectric coatings.

It is, thus, apparent that there is provided, in accordance with the present disclosure, stable interferometers and methods for the fabrication and use thereof in wavelength calibration. Many alternatives, modifications, and variations are enabled by the present disclosure. Features of the disclosed embodiments can be combined, rearranged, omitted, etc., within the scope of the invention to produce additional embodiments. Furthermore, certain features may sometimes be used to advantage without a corresponding use of other features. Accordingly, Applicants intend to embrace all such alternatives, modifications, equivalents, and variations that are within the spirit and scope of the present invention.

The invention claimed is:

1. An apparatus comprising:
   a monolithic Michelson interferometer including:
      a beamsplitter constructed to divide wide-band input light incident on an input surface thereof into a reflected beam along a reflected light path and a transmitted beam along a transmitted light path;
      a first mirror element arranged in the reflected light path and secured to the beamsplitter; and
      a second mirror element arranged in the transmitted light path and secured to the beamsplitter;
   wherein an absolute value of a thermal sensitivity of an optical path difference, D, between the reflected and transmitted light paths is no more than $3 \times 10^{-6}/°$ C., and
   the interferometer is constructed so as to have a full field of angle with respect to the input surface that is at least 6° for a phase shift less than π radians.

2. The apparatus of claim 1, further comprising a wide-band light source arranged to direct wide-band light onto the input surface of the beamsplitter so as to generate a wavelength-modulated light output.

3. The apparatus of claim 2, further comprising a reference spectrometer configured to generate reference data as a function of wavelength based at least in part on said interference pattern light output.

4. The apparatus of claim 1, further comprising a thermal enclosure that contains at least the monolithic Michelson interferometer therein and controls a temperature thereof.

5. The apparatus of claim 1, wherein the first and second mirror elements are second surface mirrors.

6. The apparatus of claim 1, wherein the first and second mirror elements are in direct contact with a corresponding surface of the beamsplitter.

7. The apparatus of claim 1, wherein additional optical elements are arranged in at least one of the reflected and transmitted light paths between the beamsplitter and a respective one of the first and second mirror elements.

8. The apparatus of claim 1, wherein
the first mirror element is a second surface mirror and an input surface thereof is in direct contact with a first surface of the beamsplitter, the first mirror element having a thickness $t_1$,
the second mirror element is a second surface mirror and an input surface thereof is in direct contact with a second surface of the beamsplitter, the second mirror element having a thickness $t_2$,
the beamsplitter and the first mirror element are made of a first material, the first material having a refractive index of $n_1$ and a coefficient of thermal expansion of $\alpha_1$, and
the second mirror element is made of a second material different from the first material, the second material having a refractive index of $n_2$ and a coefficient of thermal expansion of $\alpha_2$.

9. The apparatus of claim 8, wherein the optical path difference, D, and the materials and thicknesses of the first mirror element and the second mirror element satisfy the following equations:

$$\frac{t_1}{n_1} = \frac{t_2}{n_2}, \text{ and}$$

$$n_1 \frac{dn_1}{dT} + \alpha_1 n_1^2 = n_2 \frac{dn_2}{dT} + \alpha_2 n_2^2,$$

where T is a temperature of the interferometer.

10. The apparatus of claim 1, wherein a first surface and a second surface of the beamsplitter are uncoated, and the input surface and an output surface of the beamsplitter have an anti-reflection coating thereon.

11. The apparatus of claim 10, wherein respective input surfaces of the first mirror element and of the second mirror element are uncoated.

12. The apparatus of claim 1, wherein respective coefficients of thermal expansion for materials of the beamsplitter, the first mirror element, and the second mirror element are within $2 \times 10^{-6}/°$ C. of each other.

13. An apparatus comprising:
a monolithic Michelson interferometer including:
  a beamsplitter constructed to divide wide-band input light incident on an input surface thereof into a reflected beam along a reflected light path and a transmitted beam along a transmitted light path;
  a first mirror element arranged in the reflected light path and secured to the beamsplitter; and
  a second mirror element arranged in the transmitted light path and secured to the beamsplitter;
wherein an absolute value of a thermal sensitivity of an optical path difference, D, between the reflected and transmitted light paths is no more than $3 \times 10^{-6}/°$ C.,
the first mirror element is a second surface mirror and an input surface of the first mirror element is in direct contact with a first surface of the beamsplitter, the first mirror element having a thickness $t_1$,
the second mirror element is a second surface mirror and an input surface of the second mirror element is in direct contact with a first surface of a spacer element, a second surface of the spacer element being in direct contact with a second surface of the beamsplitter, the second mirror element having a thickness $t_3$, the spacer element having a thickness $t_2$ and an air gap therein,
the beamsplitter, the first mirror element, and the spacer element are made of a first material, the first material having a refractive index of $n_1$ and a coefficient of thermal expansion of $\alpha_1$, and
the second mirror element is made of a second material different from the first material, the second material having a refractive index of $n_3$ and a coefficient of thermal expansion of $\alpha_3$.

14. The apparatus of claim 13, wherein the optical path difference, D, and the materials and thicknesses of the first mirror element, the second mirror element, and the spacer element satisfy the following equations:

$$n_3 t_3 + t_2 - n_1 t_1 = \pm \frac{D}{2},$$

$$\frac{t_3}{n_3} + t_2 - \frac{t_1}{n_1} = 0, \text{ and}$$

$$\left(\frac{dn_3}{dT} + \alpha_3 n_3\right) t_3 + \alpha_1 t_2 - \left(\frac{dn_1}{dT} + \alpha_1 n_1\right) t_1 = 0,$$

where T is a temperature of the interferometer.

15. An apparatus comprising:
a monolithic Michelson interferometer including:
  a beamsplitter constructed to divide wide-band input light incident on an input surface thereof into a reflected beam along a reflected light path and a transmitted beam along a transmitted light path;
  a first mirror element arranged in the reflected light path and secured to the beamsplitter; and
  a second mirror element arranged in the transmitted light path and secured to the beamsplitter;
wherein an absolute value of a thermal sensitivity of an optical path difference, D, between the reflected and transmitted light paths is no more than $3 \times 10^{-6}/°$ C.,
one of the first and second mirror elements has an input surface thereof in direct contact with a first surface of the beamsplitter,
the other of the first and second mirror elements is a second surface mirror and has an input surface thereof in direct contact with a first surface of a spacer element, a second surface of the spacer element being in direct contact with a second surface of the beamsplitter, the spacer element having an air gap therein,
the beamsplitter, said one of the first and second mirror elements, and the spacer element are made of a first material, the first material having a refractive index of $n_1$ and a coefficient of thermal expansion of $\alpha_1$, and
said other of the first and second mirror elements is made of a second material different from the first material, the second material having a coefficient of thermal expansion of $\alpha_3$.

16. The apparatus of claim 15, wherein both the first and second mirror elements are second surface mirrors,
said one of the first and second mirror elements has a thickness $t_1$,
said other of the first and second mirror elements has a thickness $t_3$ and a refractive index of $n_3$,
said spacer has a thickness $t_2$, and
the optical path difference, D, and the materials and thicknesses of the first mirror element, the second mirror element, and the spacer element satisfy the following equations:

$$n_3 t_3 + t_2 - n_1 t_1 = \pm \frac{D}{2},$$

$$\frac{t_3}{n_3} + t_2 - \frac{t_1}{n_1} = 0, \text{ and}$$

$$\left(\frac{dn_3}{dT}+\alpha_3 n_3\right)t_3+\alpha_1 t_2-\left(\frac{dn_1}{dT}+\alpha_1 n_1\right)t_1=0,$$

where T is a temperature of the interferometer.

17. The apparatus of claim 15, wherein respective coefficients of thermal expansion for materials of the beamsplitter, the first mirror element, and the second mirror element are within $2\times10^{-6}/°$ C. of each other.

18. A monolithic Michelson interferometer comprising:
a beamsplitter constructed to divide wide-band input light incident on an input surface thereof into a reflected beam along a reflected light path and a transmitted beam along a transmitted light path;
a first mirror element arranged in the reflected light path and secured to the beamsplitter; and
a second mirror element arranged in the transmitted light path and secured to the beamsplitter;
wherein an absolute value of a thermal sensitivity of an optical path difference, D, between the reflected and transmitted light paths is no more than $3\times10^{-6}/°$ C.,
a full field of angle of the interferometer with respect to the input surface is at least 6° for a phase shift less than $\pi$ radians, and
respective coefficients of thermal expansion for materials of the beamsplitter, the first mirror element, and the second mirror element are within than $2\times10^{-6}/°$ C. of each other.

* * * * *